(12) United States Patent
Björkman et al.

(10) Patent No.: US 11,198,427 B2
(45) Date of Patent: Dec. 14, 2021

(54) METHOD FOR CONTROLLING A HYBRID DRIVELINE

(71) Applicant: Scania CV AB, Södertälje (SE)

(72) Inventors: Mathias Björkman, Tullinge (SE);
Niklas Pettersson, Stockholm (SE);
Johan Lindström, Nyköping (SE);
Mikael Bergquist, Huddinge (SE)

(73) Assignee: Scania CVAB, Södertälje (SE)

( * ) Notice: Subject to any disclaimer, the term of this patent is extended or adjusted under 35 U.S.C. 154(b) by 907 days.

(21) Appl. No.: 15/124,853

(22) PCT Filed: Mar. 17, 2015

(86) PCT No.: PCT/SE2015/050295
§ 371 (c)(1),
(2) Date: Sep. 9, 2016

(87) PCT Pub. No.: WO2015/142255
PCT Pub. Date: Sep. 24, 2015

(65) Prior Publication Data
US 2017/0015305 A1    Jan. 19, 2017

(30) Foreign Application Priority Data
Mar. 20, 2014    (SE) .................................. 1450321-3

(51) Int. Cl.
*B60W 20/50*    (2016.01)
*B60K 6/365*    (2007.10)
(Continued)

(52) U.S. Cl.
CPC ............ *B60W 20/50* (2013.01); *B60K 6/365* (2013.01); *B60K 6/38* (2013.01); *B60K 6/405* (2013.01);
(Continued)

(58) Field of Classification Search
CPC ........................................................ B60W 20/30
(Continued)

(56) References Cited

U.S. PATENT DOCUMENTS 3,226,513 A   12/1965   Frowein et al.
5,591,097 A   1/1997    Petri et al.
(Continued)

FOREIGN PATENT DOCUMENTS

DE    19903936 A1   5/2000
DE    19950679 A1   4/2001
(Continued)

OTHER PUBLICATIONS

Machine Translation DE102008043732.*
(Continued)

*Primary Examiner* — Charles A Fox
*Assistant Examiner* — Michael E Butler
(74) *Attorney, Agent, or Firm* — Moore & Van Allen PLLC; W. Kevin Ransom

(57) ABSTRACT

A method is provided to control a hybrid powertrain to achieve a desired engine speed in a combustion engine, said powertrain comprising: a gearbox with input and output shafts with the combustion engine connected to the input shaft; a first planetary gear connected to the input shaft and a first main shaft; a second planetary gear connected to the first planetary gear and a second main shaft; first and second electrical machines respectfully connected to the first and second planetary gears; first gear pair connected with the first main shaft; and second gear pair connected with the second main shaft. The method comprises a) ensuring that two rotatable components in the first planetary gear are connected; b) ensuring that all rotatable components in the second planetary gear are disconnected; c) ensuring that a gear is engaged in the first gear pair, d) ensuring that the
(Continued)

second gear pair is disconnected; e) controlling the second electrical machine so that a desired torque is achieved in the output shaft; f) controlling the combustion engine to a desired engine speed; and g) controlling the first electrical machine so that a desired total power consumption for the first and the second electrical machines is achieved.

11 Claims, 4 Drawing Sheets

(51) Int. Cl.
| | | |
|---|---|---|
| *B60W 10/06* | (2006.01) | |
| *B60W 10/08* | (2006.01) | |
| *B60K 6/445* | (2007.10) | |
| *B60W 20/10* | (2016.01) | |
| *B60K 6/38* | (2007.10) | |
| *B60K 6/405* | (2007.10) | |
| *B60K 6/44* | (2007.10) | |
| *B60K 6/547* | (2007.10) | |
| *B60W 10/02* | (2006.01) | |
| *B60W 10/115* | (2012.01) | |
| *B60W 20/30* | (2016.01) | |
| *F16H 3/72* | (2006.01) | |
| *F16H 37/04* | (2006.01) | |

(52) U.S. Cl.
CPC ............... *B60K 6/44* (2013.01); *B60K 6/445* (2013.01); *B60K 6/547* (2013.01); *B60W 10/02* (2013.01); *B60W 10/06* (2013.01); *B60W 10/08* (2013.01); *B60W 10/115* (2013.01); *B60W 20/10* (2013.01); *B60W 20/30* (2013.01); *F16H 3/728* (2013.01); *F16H 37/042* (2013.01); *B60W 2710/0644* (2013.01); *B60Y 2200/92* (2013.01); *B60Y 2300/425* (2013.01); *B60Y 2300/70* (2013.01); *F16H 2200/2007* (2013.01); *Y02T 10/62* (2013.01); *Y10S 903/911* (2013.01); *Y10S 903/919* (2013.01); *Y10S 903/945* (2013.01); *Y10S 903/946* (2013.01)

(58) Field of Classification Search
USPC .......................................................... 701/58
See application file for complete search history.

(56) References Cited

U.S. PATENT DOCUMENTS

| | | | |
|---|---|---|---|
| 5,730,676 | A | 3/1998 | Schmidt |
| 5,980,410 | A | 11/1999 | Stemler et al. |
| 6,306,057 | B1 | 10/2001 | Morisawa et al. |
| 6,558,283 | B1 | 5/2003 | Klaus-Peter |
| 6,655,485 | B1 | 12/2003 | Ito et al. |
| 6,740,002 | B1 | 5/2004 | Stridsberg |
| 6,805,648 | B1 | 10/2004 | Ehrlinger |
| 7,034,481 | B2 | 4/2006 | Imai |
| 7,479,081 | B2 | 1/2009 | Holmes |
| 7,500,933 | B2 | 3/2009 | Baasch et al. |
| 7,575,529 | B2 | 8/2009 | Holmes |
| 7,931,102 | B2 | 4/2011 | Katsuta et al. |
| 8,047,314 | B2 | 11/2011 | Oba et al. |
| 8,091,661 | B2 | 1/2012 | Oba et al. |
| 8,100,207 | B2 | 1/2012 | Oba et al. |
| 8,122,983 | B2 | 2/2012 | Katsuta et al. |
| 8,210,296 | B2 | 7/2012 | Katsuta et al. |
| 8,215,426 | B2 | 7/2012 | Katsuta et al. |
| 8,226,513 | B2 | 7/2012 | Abe et al. |
| 8,231,491 | B2 | 7/2012 | Oba et al. |
| 8,251,165 | B2 | 8/2012 | Katsuta et al. |
| 8,272,991 | B2 | 9/2012 | Katsuta et al. |
| 8,398,515 | B2 | 3/2013 | Sartre et al. |
| 8,721,482 | B2 | 5/2014 | Takami |
| 8,733,190 | B2 | 5/2014 | Palfai et al. |
| 9,140,201 | B2 | 9/2015 | Kato et al. |
| 9,482,330 | B1 * | 11/2016 | Holmes .................. H02K 99/00 |
| 9,541,167 | B2 | 1/2017 | Lindström et al. |
| 9,562,592 | B2 | 2/2017 | Rekow et al. |
| 9,770,969 | B2 | 9/2017 | Böjrkman et al. |
| 2001/0048226 | A1 | 12/2001 | Nada |
| 2002/0045507 | A1 | 4/2002 | Bowen |
| 2002/0088288 | A1 | 7/2002 | Bowen |
| 2002/0148659 | A1 | 10/2002 | Bordini |
| 2003/0013569 | A1 | 1/2003 | Doepke |
| 2003/0100395 | A1 * | 5/2003 | Hiraiwa ................ B60W 10/10 475/5 |
| 2003/0166429 | A1 | 9/2003 | Tumback |
| 2004/0077448 | A1 | 4/2004 | Oshidari et al. |
| 2004/0082419 | A1 | 4/2004 | Randall |
| 2005/0072609 | A1 | 4/2005 | Eisenhardt et al. |
| 2005/0102082 | A1 | 5/2005 | Joe et al. |
| 2005/0126836 | A1 | 6/2005 | Bischoff |
| 2005/0221943 | A1 | 10/2005 | Kuhstrebe |
| 2005/0227803 | A1 | 10/2005 | Holmes |
| 2005/0256629 | A1 | 11/2005 | Tao et al. |
| 2006/0113129 | A1 * | 6/2006 | Tabata .................... B60K 6/365 180/65.25 |
| 2006/0196463 | A1 * | 9/2006 | Pallett .................... B60W 20/13 123/192.1 |
| 2007/0087894 | A1 | 4/2007 | Tsuneyoshi et al. |
| 2007/0099738 | A1 | 5/2007 | Holmes |
| 2007/0125083 | A1 | 6/2007 | Rollinger et al. |
| 2007/0243966 | A1 | 10/2007 | Holmes et al. |
| 2008/0064550 | A1 | 3/2008 | Holmes |
| 2008/0103002 | A1 | 5/2008 | Holmes |
| 2008/0109139 | A1 | 5/2008 | Muta et al. |
| 2008/0224478 | A1 | 9/2008 | Tamor |
| 2008/0245167 | A1 | 10/2008 | Gift |
| 2008/0254932 | A1 | 10/2008 | Heinzelmann |
| 2008/0269000 | A1 | 10/2008 | Abe et al. |
| 2008/0300082 | A1 | 12/2008 | Abe |
| 2008/0300744 | A1 * | 12/2008 | Katsuta .................. B60L 58/12 701/22 |
| 2009/0037060 | A1 | 2/2009 | Carlhammar et al. |
| 2009/0055061 | A1 * | 2/2009 | Zhu ......................... B60K 6/48 701/55 |
| 2009/0076693 | A1 | 3/2009 | Kumazaki et al. |
| 2009/0076694 | A1 | 3/2009 | Tabata et al. |
| 2009/0118925 | A1 | 5/2009 | Hsieh et al. |
| 2009/0236160 | A1 | 9/2009 | Tanaka et al. |
| 2009/0248264 | A1 | 10/2009 | Kubo |
| 2009/0320629 | A1 | 12/2009 | Akashi et al. |
| 2010/0000814 | A1 | 1/2010 | Katsuta et al. |
| 2010/0006360 | A1 | 1/2010 | Kishimoto |
| 2010/0012405 | A1 | 1/2010 | Katsuta et al. |
| 2010/0023436 | A1 | 1/2010 | Weild, IV |
| 2010/0029428 | A1 | 2/2010 | Abe et al. |
| 2010/0029436 | A1 | 2/2010 | Katsuta et al. |
| 2010/0045220 | A1 | 2/2010 | Yamada et al. |
| 2010/0051360 | A1 | 3/2010 | Oba et al. |
| 2010/0051361 | A1 | 3/2010 | Katsuta et al. |
| 2010/0051367 | A1 | 3/2010 | Yamada et al. |
| 2010/0078238 | A1 | 4/2010 | Oba et al. |
| 2010/0125019 | A1 | 5/2010 | Tabata et al. |
| 2010/0304920 | A1 | 12/2010 | Simon |
| 2011/0143874 | A1 | 6/2011 | Tangl |
| 2011/0294620 | A1 | 12/2011 | Pruitt et al. |
| 2011/0300983 | A1 | 12/2011 | Kurokawa |
| 2011/0312463 | A1 | 12/2011 | Park |
| 2012/0040794 | A1 | 2/2012 | Schoolcraft |
| 2012/0197475 | A1 | 8/2012 | Akutsu et al. |
| 2012/0226401 | A1 | 9/2012 | Naito |
| 2012/0270698 | A1 | 10/2012 | Hisada et al. |
| 2013/0006489 | A1 | 1/2013 | Kim |
| 2013/0017926 | A1 * | 1/2013 | Miwa ..................... B60K 6/445 477/3 |
| 2013/0023379 | A1 | 1/2013 | Bucknor et al. |
| 2013/0063061 | A1 | 3/2013 | Hanada |
| 2013/0095975 | A1 | 4/2013 | Otten |
| 2013/0123054 | A1 | 5/2013 | Eo et al. |
| 2013/0190132 | A1 | 7/2013 | Izawa |

(56) References Cited

U.S. PATENT DOCUMENTS

| | | |
|---|---|---|
| 2013/0233268 A1 | 9/2013 | Yamaguchi et al. |
| 2013/0260936 A1 | 10/2013 | Takei et al. |
| 2013/0261863 A1 | 10/2013 | Noguchi |
| 2013/0324347 A1 | 12/2013 | Lewton et al. |
| 2013/0345007 A1 | 12/2013 | Wenthen |
| 2013/0345009 A1 | 12/2013 | Iwasa |
| 2014/0033843 A1 | 2/2014 | Van Druten et al. |
| 2014/0094336 A1 | 4/2014 | Versteyhe et al. |
| 2014/0121054 A1 | 5/2014 | Bergquist et al. |
| 2014/0128206 A1 | 5/2014 | Noh et al. |
| 2014/0162823 A1 | 6/2014 | Choi et al. |
| 2014/0162832 A1 | 6/2014 | Noh et al. |
| 2014/0174231 A1 | 6/2014 | Beirinckx et al. |
| 2014/0191689 A1 | 7/2014 | Noguchi et al. |
| 2014/0256493 A1 | 9/2014 | Knoblauch |
| 2014/0371022 A1 | 12/2014 | Eo et al. |
| 2014/0371023 A1 | 12/2014 | Janson |
| 2014/0371025 A1 | 12/2014 | Oita et al. |
| 2015/0006000 A1* | 1/2015 | Kawata ............... B60K 6/48 701/22 |
| 2015/0072819 A1* | 3/2015 | Ono ............... B60W 20/00 475/5 |
| 2015/0149012 A1 | 5/2015 | Pettersson et al. |
| 2015/0183423 A1 | 7/2015 | Yamamoto et al. |
| 2015/0197146 A1 | 7/2015 | Vagstedt et al. |
| 2015/0203097 A1 | 7/2015 | Pettersson et al. |
| 2015/0232082 A1* | 8/2015 | Frank ............... B60W 20/10 701/22 |
| 2015/0299984 A1 | 10/2015 | Mattsson et al. |
| 2015/0300456 A1 | 10/2015 | Lichtenegger |
| 2015/0345629 A1 | 12/2015 | Liu |
| 2015/0375734 A1 | 12/2015 | Pettersson et al. |
| 2016/0003341 A1 | 1/2016 | Sieveking et al. |
| 2016/0046180 A1 | 2/2016 | Hwang et al. |
| 2016/0047441 A1 | 2/2016 | Björkman et al. |
| 2016/0053863 A1 | 2/2016 | Glover et al. |
| 2016/0053864 A1 | 2/2016 | Lindström et al. |
| 2016/0061297 A1 | 3/2016 | Lindström et al. |
| 2016/0091063 A1 | 3/2016 | Rekow et al. |
| 2016/0131227 A1 | 5/2016 | Beck et al. |
| 2016/0138466 A1 | 5/2016 | Ge |
| 2016/0159934 A1* | 6/2016 | Grison ............... B01J 37/36 536/20 |
| 2017/0008510 A1 | 1/2017 | Imamura et al. |
| 2017/0015299 A1 | 1/2017 | Björkman et al. |
| 2017/0015303 A1 | 1/2017 | Björkman et al. |
| 2017/0015325 A1 | 1/2017 | Lindström et al. |
| 2017/0028982 A1 | 2/2017 | Björkman et al. |
| 2017/0291607 A1 | 10/2017 | Bergquist et al. |

FOREIGN PATENT DOCUMENTS

| | | |
|---|---|---|
| DE | 10052393 A1 | 5/2002 |
| DE | 102006025525 A1 | 12/2007 |
| DE | 102007022129 A1 | 11/2008 |
| DE | 102008043732 A1 | 6/2009 |
| DE | 102008032320 A1 | 1/2010 |
| DE | 102009000723 A1 | 8/2010 |
| DE | 102010029597 A1 | 12/2011 |
| EP | 1199204 A1 | 4/2002 |
| EP | 1275547 A2 | 1/2003 |
| EP | 1280677 A1 | 8/2004 |
| EP | 1126987 A1 | 8/2005 |
| EP | 1157873 A2 | 2/2006 |
| EP | 2113434 A1 | 11/2009 |
| JP | 2011084116 A | 4/2011 |
| WO | 0183249 A2 | 11/2001 |
| WO | 2008046185 A1 | 4/2008 |
| WO | 2008081893 A1 | 7/2008 |
| WO | 2009024162 A1 | 2/2009 |
| WO | 2009047540 A1 | 4/2009 |
| WO | 2012055527 A1 | 5/2012 |
| WO | 2012073651 A1 | 6/2012 |
| WO | 2013076566 A1 | 5/2013 |
| WO | 2013088568 A1 | 6/2013 |
| WO | 2013177783 A1 | 12/2013 |
| WO | 2014046580 A1 | 3/2014 |

OTHER PUBLICATIONS

Scania CV AB, Swedish Application No. 1450321-3, Office Action, dated Oct. 24, 2014.

European Search Report for PCT/SE2015/050295 dated Oct. 11, 2017.

International Preliminary Report on Patentability for PCT/SE2015/050295 dated Jun. 8, 2016.

International Search Report for PCT/SE2015/050295 dated Jun. 22, 2015.

Written Opinion of the International Search Authority for PCT/SE2015/050295 dated Jun. 22, 2015.

* cited by examiner

METHOD FOR CONTROLLING A HYBRID DRIVELINE

CROSS-REFERENCE TO RELATED REFERENCE(S)

This application is a national stage application (filed under 35 § U.S.C. 371) of PCT/SE15/050295, filed Mar. 17, 2015 of the same title, which, in turn claims priority to Swedish Application No. 1450321-3, filed Mar. 20, 2014 of the same title; the contents of each of which are hereby incorporated by reference.

FIELD OF THE INVENTION

The present invention relates to a method, vehicle, and computer program product to control a hybrid powertrain in order to achieve a desired favorable engine speed in a combustion engine, arranged in the hybrid powertrain.

BACKGROUND OF THE INVENTION

Hybrid vehicles may be driven by a primary engine, which may be a combustion engine, and a secondary engine, which may be an electrical machine. The electrical machine is equipped with at least one energy storage device, such as an electro-chemical energy storage device, for storage of electric power and control equipment to control the flow of electric power between the energy storage device and the electrical machine. The electrical machine may thus alternately operate as a motor and as a generator, depending on the vehicle's operating mode. When the vehicle is braked, the electrical machine generates electric power, which is stored in the energy storage device. This is usually referred to as regenerative braking, which entails that the vehicle is decelerated with the help of the electrical machine and the combustion engine. The stored electric power is used later for operation of the vehicle.

A gearbox in a hybrid vehicle may comprise a planetary gear. The planetary gearbox usually comprises three components, which are rotatably arranged in relation to each other, namely a sun wheel, a planetary wheel carrier and an internal ring gear. With knowledge about the number of cogs in the sun wheel and the internal ring gear, the mutual speeds of the three components may be determined during operation. One of the components of the planetary gear may be connected with an output shaft in a combustion engine. This component of the planetary gear thus rotates with a rotational speed corresponding to the rotational speed of the output shaft in the combustion engine. A second component in the planetary gear may be connected with an input shaft to a transmission device. This component of the planetary gear thus rotates with the same rotational speed as the input shaft to the transmission device. A third component in the planetary gear is used to achieve hybrid operation, connected with a rotor in an electrical machine. This component in the planetary gear thus rotates with the same rotational speed as the rotor of the electrical machine, if they are directly connected with each other. Alternatively, the electrical machine may be connected with the third component of the planetary gear via a transmission that has a gearing. In this case, the electrical machine and the third component in the planetary gear may rotate with different rotational speeds. The engine speed and/or the torque of the electrical machine may be controlled steplessly. During operating times when the input shaft to the transmission device must be provided with a rotational engine speed and/or torque, a control device having knowledge about the engine speed of the combustion engine calculates the rotational speed with which the third component must be operated, in order for the input shaft to the transmission device to obtain the desired rotational speed. A control device activates the electrical machine, so that it provides the third component with the calculated engine speed and thus the input shaft to the transmission device with the desired rotational speed.

Depending on the design of the gearbox connected to the planetary gear, a torque interruption between the gear steps may be avoided. Often, however, separate and complex devices are required in the gearbox in order to eliminate or reduce the torque interruption, so that a perception of stepless gear shifts is obtained.

By connecting the combustion engine's output shaft, the electrical machine's rotor and the transmission device's input shaft with a planetary gear, the conventional clutch mechanism may be avoided. At acceleration of the vehicle, an increased torque must be delivered from the combustion engine and the electrical machine to the transmission device, and further to the vehicle's driving wheels. Since both the combustion engine and the electrical machine are connected with the planetary gear, the largest possible torque delivered by the combustion engine and the electrical machine will be limited by one of these drive units; i.e. the one whose maximum torque is lower than the second drive unit's maximum torque, having regard to the gearing between them. In case the electrical machine's highest torque is lower than the combustion engine's highest torque, having regard to the gearing between them, the electrical machine will not be able to generate a sufficiently large reaction torque to the planetary gear, entailing that the combustion engine may not transfer its highest torque to the transmission device and further to the vehicle's driving wheels. Thus, the highest torque that may be transferred to the transmission device is limited by the electrical machine's strength. This is also apparent from the so-called planet equation.

Using a conventional clutch, which disconnects the gearbox's input shaft from the combustion engine during shifting processes in the gearbox, entails disadvantages, such as heating of the clutch's discs, resulting in wear of the clutch discs and an increased fuel consumption. A conventional clutch mechanism is also relatively heavy and costly. It also occupies a relatively large space in the vehicle.

In a vehicle, the space available for the drive arrangement is often limited. If the drive arrangement comprises several components, such as a combustion engine, an electrical machine, a gearbox and a planetary gear, the construction must be compact. If there are additional components, such as a regenerative braking device, the requirements that the component parts must have a compact construction are even more stringent. At the same time, the component parts in the drive arrangement must be designed with dimensions that are able to absorb the required forces and torque.

For some types of vehicles, especially heavy goods vehicles and buses, a large number of gear steps is required. Thus, the number of component parts in the gearbox increases, which must also be dimensioned to be able to absorb large forces and torque arising in such heavy goods vehicles. This results in an increase of the size and weight of the gearbox.

There are also requirements for high reliability and high dependability of the components comprised in the drive device. In case the gearbox comprises multi-plate clutches, a wear arises, which impacts the reliability and life of the gearbox.

At regenerative braking, kinetic energy is converted into electric power, which is stored in an energy storage device, such as accumulators. One factor impacting on the life of the energy storage device is the number of cycles in which the energy storage device provides and extracts power to and from the electric machines. The more cycles, the shorter the life of the energy storage device.

In certain operating modes and for some types of combustion engines, it may be advantageous to control the engine speed of the combustion engine independently of the vehicle's speed. For example, this may be advantageous for combustion engines with large differences in efficiency, depending on the operating point. Furthermore, it may be advantageous in cases where the combustion engine comprises an exhaust after treatment system, which functions less efficiently at certain engine speeds and torques in the combustion engine.

The document EP-B1-1126987 shows a gearbox with double planetary gears. Each sun wheel of the planetary gear is connected to an electrical machine, and the internal wheels of the planetary gears are connected with each other. The planetary wheel carrier in each planetary gear is connected to a number of gear pairs, so that an infinite number of gear steps is obtained. Another document, EP-B1-1280677, also shows how the planetary gears may be bridged with a gear step arranged on the combustion engine's output shaft.

The document US-A1-20050227803 shows a vehicle transmission with two electric machines, connected to the respective sun wheels in two planetary gears. The planetary gears have a common planetary wheel carrier, which is connected to the transmission's input shaft.

The document WO2008/046185-A1 shows a hybrid transmission with two planetary gears, wherein one electrical machine is connected to one of the planetary gears and a double clutch interacts with the second planetary gear. Both planetary gears also interact with each other via a cogwheel transmission.

SUMMARY OF THE INVENTION

Despite prior art solutions in the field, there is a need to further develop a method to control a hybrid powertrain, in order to achieve a favorable engine speed in the combustion engine, independently of the power train's rotational speed.

The objective of this invention is to provide a novel and advantageous method to control a hybrid powertrain, which achieves a desired driving torque in the powertrain.

Another objective of the invention is to provide a novel and advantageous method to control a hybrid powertrain, facilitating control of a combustion engine's engine speed, independently of the hybrid drive line's rotational speed.

Another objective of the invention is to provide a novel and advantageous computer program to control a hybrid powertrain.

Thanks to the method according to the invention, an efficient and reliable method is obtained for control of a hybrid powertrain, in order to achieve a desired favorable engine speed in a combustion engine arranged in the hybrid powertrain. The hybrid powertrain comprises a combustion engine; a gearbox with an input shaft and an output shaft; a first planetary gear, connected to the input shaft and a first main shaft; a second planetary gear, connected to the first planetary gear and a second main shaft; a first electrical machine, connected to the first planetary gear; a second electrical machine, connected to the second planetary gear; at least one gear pair, connected with the first main shaft, and therefore with the first planetary gear and the output shaft; and at least one gear pair, connected with the second main shaft, and therefore with the second planetary gear and the output shaft, wherein the combustion engine is connected with the input shaft of the gearbox. By ensuring that two rotatable components in the first planetary gear are connected with each other; by ensuring that all the rotatable components in the second planetary gear are disconnected from each other; by ensuring that a gear, corresponding to the at least one gear pair joined with the second planetary gear is engaged; by ensuring that the at least one gear pair joined with the first planetary gear is disconnected; by controlling the second electrical machine so that a desired torque is achieved in the output shaft; by controlling the combustion engine to a desired engine speed; and by controlling the first electrical machine, in such a way that a desired total power consumption for the first and the second electrical machine is achieved, an optimal engine speed may be achieved in the combustion engine, while a desired torque is achieved in the output shaft, and a desired electric power is achieved in the energy storage device. Accordingly, the combustion engine's engine speed may be controlled and optimized independently of the hybrid drive line's rotational speed.

A first and second coupling device is arranged between the planetary wheel carrier and the sun wheel of the respective planetary gears. The task of the coupling devices is to lock the respective planetary wheel carriers with the sun wheel. When the planetary wheel carrier and the sun wheel are connected with each other, the power from the combustion engine will pass through the planetary wheel carrier, the coupling device, the sun wheel and further along to the gearbox, which entails that the planetary wheels do not absorb any torque. This entails that the dimension of the planetary wheels may be adapted only to the electrical machine's torque instead of the combustion engine's torque, which in turn means the planetary wheels may be designed with smaller dimensions. Thus, a drive arrangement according to the invention is obtained, which has a compact construction, a low weight and a low manufacturing cost.

The coupling devices and the locking mechanisms preferably comprise an annular sleeve, which is shifted axially between a connected and a disconnected state. The sleeve encloses, substantially concentrically, the gearbox's rotating components and is moved between the connected and disconnected state with a power element. Thus, a compact construction is obtained, with a low weight and a low manufacturing cost.

In the event two rotatable components of the first planetary gear are not connected, the combustion engine is preferably controlled in such a way that a synchronous rotational speed is achieved between a first planetary wheel carrier, arranged in the first planetary gear, and a first sun wheel, wherein the first coupling device is shifted, so that the first planetary wheel carrier and the first sun wheel are connected.

In the event that all rotatable components in the second planetary gear are not disconnected, preferably the first and/or the second electrical machine are controlled in such a way that torque balance is achieved in the second planetary gear, following which the second coupling device is shifted, so that a second planetary wheel carrier, arranged in the second planetary gear, and a second sun wheel are disconnected from each other.

Torque balance relates to a state where a torque acts on an internal ring gear arranged in the planetary gear, representing the product of the torque acting on the planetary wheel carrier of the planetary gear and the gear ratio of the planetary gear, while simultaneously a torque acts on the planetary gear's sun wheel, representing the product of the torque acting on the planetary wheel carrier and (1—the planetary gear's gear ratio). In the event two of the planetary gear's component parts, the sun wheel, ring gear or planetary wheel carriers, are connected with a coupling device, this coupling device does not transfer any torque between the planetary gear's parts when torque balance prevails. Accordingly, the coupling device may easily be shifted and the planetary gear's component parts be disconnected.

Preferably, the first main shaft and the second main shaft are connected to a transmission device comprising a number of connectable and disconnectable gear pairs. The gear pairs comprise cogwheels, which are mechanically lockable with and disconnectable from the countershaft. Thus, a number of fixed gear steps is obtained, which may be shifted without torque interruption. The cogwheels that may be locked on the countershaft also result in a compact construction with a high reliability and high dependability. A gear pair may thus be disconnected, whereat the corresponding cogwheel is disconnected from the countershaft, and a gear pair may be connected, whereat the corresponding cogwheel is connected to the countershaft. Alternatively, pinion gears in the gear pairs may be arranged to be lockable with and disconnectable from the first or second main shaft.

In the event that a gear, corresponding to the at least one gear pair joined with the second planetary gear is not engaged, preferably the second electrical machine is controlled in such a way that a synchronous rotational speed is achieved between gear pair joined with the second planetary gear and the countershaft connected with the output shaft, following which a coupling element is shifted, so that the gear pair connected with the first planetary gear and the countershaft are connected.

In the event that the at least one gear pair joined with the second planetary gear is not disconnected, preferably the first electrical machine is controlled in such a way that a state with substantially zero torque is achieved between the gear pair joined with the first planetary gear and the countershaft connected with the output shaft, following which a coupling element is shifted, so that the gear pair connected with the first planetary gear and the countershaft are disconnected from each other.

Each of the gear pairs has a gearing, which is adapted to the vehicle's desired driving characteristics. The gear pair with the highest gearing, in relation to the other gear pairs, is suitably connected when the lowest gear is engaged.

Suitably, a first planetary wheel carrier in the first planetary gear is directly connected with the combustion engine via the input shaft. Alternatively, the first planetary wheel carrier is connected with the combustion engine via a coupling device. The second planetary wheel carrier in the second planetary gear is suitably directly connected with the second main shaft, and therefore with the transmission device. Thus, a hybrid powertrain is achieved, which may transfer a large torque to the output shaft, and the therewith connected driving wheels in all operating modes, without being dependent on electric power from thane energy storage device.

According to one embodiment, the engine speed desired in the combustion engine is based on a required power from the combustion engine. Since the power of the combustion engine is the product of its torque and engine speed, the engine speed may be obtained with a determined value for the power. The desired engine speed is a favorable engine speed with respect to among others fuel consumption, noise from the combustion engine and, for example, favorable operating conditions for the exhaust after treatment system. The desired engine speed is determined in a control device connected with the hybrid drive line.

According to one embodiment the second electrical machine is controlled in such a way that a desired torque is achieved in the output shaft, the combustion engine is controlled to a desired engine speed, and the first electrical machine is controlled in such a way that a total power consumption desired by the first and the second electrical machine is achieved, in parallel.

According to one embodiment, the total power consumption desired by the first and the second electrical machine is determined based on the desired power input or output of an energy storage device, and the power consumption of other loads connected to the energy storage device. The desired power consumption is determined in the control device connected to the hybrid drive line.

The torque desired in the output shaft is any torque desired, which is determined in the control device connected to the hybrid drive line. The torque desired may be a torque requested by the vehicle's driver. The torque desired on the output shaft of the hybrid powertrain is achieved by the second electrical machine. The hybrid powertrain's driving power is the product of the torque on the output shaft and the engine speed of the output shaft. The first and the second electrical machine's mechanical power is obtained as the sum of the product of their respective torques and engine speeds. The total electrical power consumption is equal to the sum of the mechanical power and the losses in the first electrical machine and the second electrical machine. The first and the second electrical machines' total electrical power consumption is the same as the power in the energy storage device, when no other loads connected to the energy storage device use the energy storage device. The combustion engine's power is obtained as the product of the combustion engine's torque and engine speed. The combustion engine's power may also be obtained as the sum of the hybrid powertrain's power and the power consumption of the first and the second electrical machines.

According to one embodiment, the torque desired in the output shaft is achieved via a fifth gear pair. The fifth gear pair is suitably arranged between the output shaft and the countershaft. Thus, torque may be transferred from the countershaft in order to be extracted from the output shaft. Alternatively, torque may be extracted directly from the first or second main shaft, or directly from the countershaft. Torque may also be extracted in parallel from two, or all, of the three shafts simultaneously.

The electrical machines, which are connected to the planetary gears, may generate power and/or supply torque depending on the desired operating mode. The electrical machines may also, at certain operating times, supply each other with power.

The first planetary wheel carrier in the first planetary gear is preferably connected with the second sun wheel of the second planetary gear. The first sun wheel in the first planetary gear is preferably connected with the first main shaft. Alternatively, a ring gear arranged in the first planetary gear is connected with the first main shaft. The second planetary wheel carrier in the second planetary gear is preferably connected with the second main shaft. Alternatively, the first planetary wheel carrier in the first planetary gear is connected with the second internal ring gear of the second planetary gear. Thus, a transmission is obtained, which shifts gears without torque interruption.

With the gearbox according to the invention conventional slip clutches between the combustion engine and the gearbox may be avoided.

A locking mechanism is arranged to fixedly connect the combustion engine's output shaft with the gearbox housing. Thus, the first planetary wheel carrier will also be locked to the gearbox housing. By locking the combustion engine's output shaft with the locking mechanism and the first planetary wheel carrier with the gearbox's housing, the gearbox, and thus the vehicle, becomes adapted for electric operation by the electrical machines. The electrical machines thus emit a torque to the output shaft of the gearbox. Alternatively, a coupling device may be arranged between the output shaft of the combustion engine and the input shaft of the gearbox, wherein the combustion engine may be disconnected by opening the coupling device, and thus the gearbox, and therefore the vehicle may become adapted for electrical operation by the electric machines.

BRIEF DESCRIPTION OF THE DRAWINGS

Below is a description, as an example, of preferred embodiments of the invention with reference to the enclosed drawings, on which.

DETAILED DESCRIPTION OF PREFERRED EMBODIMENTS OF THE INVENTION

Figure 1:
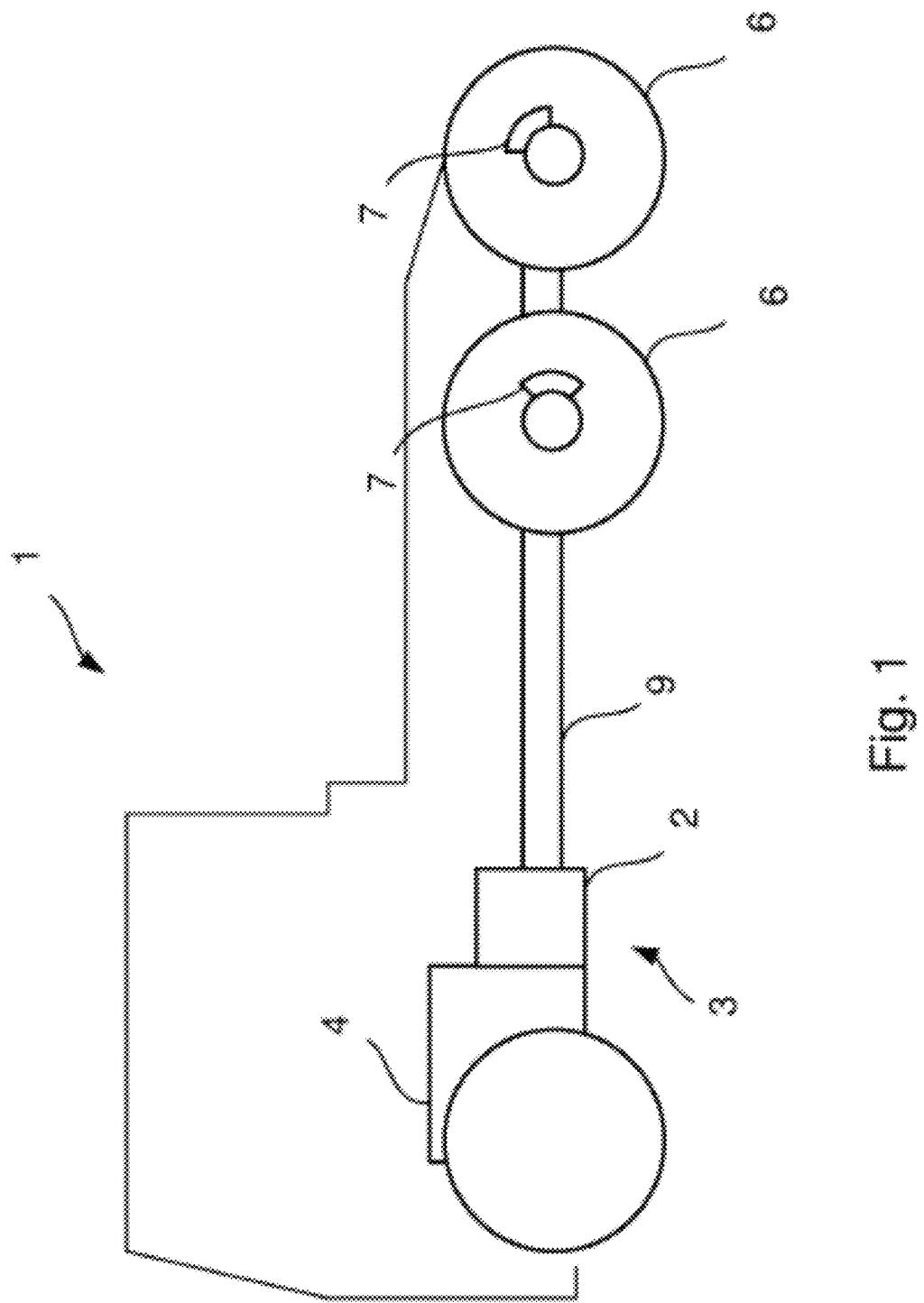
FIG. 1 schematically shows a vehicle in a side view with a hybrid powertrain, controlled according to the present invention, FIG. 2 schematically shows a side view of a hybrid powertrain, controlled according to the present invention.

FIG. 1 shows a schematic side view of a vehicle 1, comprising a gearbox 2 and a combustion engine 4, which are comprised in a hybrid powertrain 3. The combustion engine 4 is connected to the gearbox 2, and the gearbox 2 is further connected to the driving wheels 6 of the vehicle 1 via a propeller shaft 9. The driving wheels 6 are equipped with brake devices 7 to brake the vehicle 1.

Figure 2:
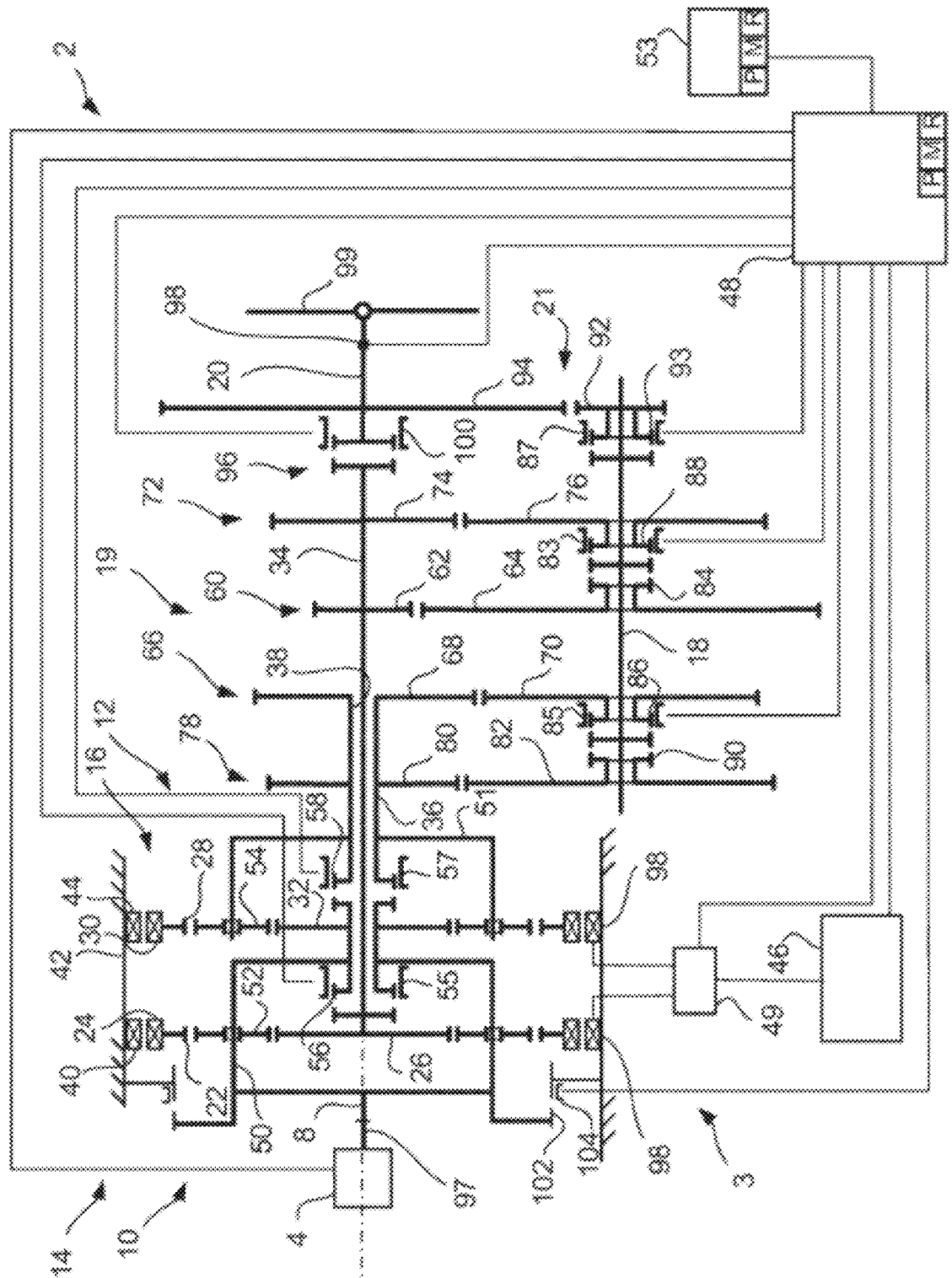

FIG. 2 shows a schematic side view of a hybrid powertrain 3 with a gearbox 2, comprising an input shaft 8, a first and a second planetary gear 10 and 12, respectively, a first and a second electrical machine 14 and 16, respectively, a countershaft 18 and an output shaft 20. The hybrid powertrain 3 comprises a combustion engine 4 connected to the gearbox 2. The combustion engine 4 is connected with the gearbox 2 via the input shaft 8 of the gearbox. The combustion engine has an output shaft 97. The output shaft 97 of the combustion engine 4 is connected to the input shaft of the gearbox 2. The first planetary gear 10 has a first internal ring gear 22, to which a first rotor 24 in the first electrical machine 14 is connected. The first planetary gear 10 also has a first sun wheel 26 and a first planetary wheel carrier 50. The first planetary wheel carrier 50 is connected with the combustion engine 4 via the input shaft 8 of the gearbox. The second planetary gear 12 has a second internal ring gear 28, to which a second rotor 30 of the second electrical machine 16 is connected. The second planetary gear 12 has a second sun wheel 32 and a second planetary wheel carrier 51. The first and the second sun wheels 26 and 32, respectively, are coaxially arranged, which, according to the embodiment displayed, entails that a first main shaft 34 arranged on the first sun wheel 26 extends inside a second main shaft 36, which is equipped with a central boring 38, arranged on the second planetary wheel carrier 51. It is also possible to arrange the first and second sun wheels 26 and 32, respectively, and also the first main shaft 34 and the second main shaft 36, in parallel with and next to each other. In this case, the countershaft 18 is suitably arranged between the first main shaft 34 and the second main shaft 36, and the torque may be extracted directly from the countershaft 18. The countershaft 18 thus constitutes, in this case, the output shaft 20.

The first electrical machine 14 is equipped with a first stator 40, which is connected to the vehicle 1, via a gear housing 42 surrounding the gearbox 2. The second electrical machine 16 is equipped with a second stator 44, which is connected to the vehicle 1, via a gear housing 42 surrounding the gearbox 2. The first and the second electrical machine 16 are connected to an energy storage device 46, such as a battery, which, depending on the vehicle's 1 operating mode, operates the electrical machines 14 and 16, respectively. At other operating modes, the electrical machines 14 and 16, respectively, may work as generators, wherein power is supplied to the energy storage device 46. An electronic control device 48 is connected to the energy storage device 46 and controls the supply of power to the electrical machines 14 and 16, respectively. Preferably the energy storage device 46 is connected to the electrical machines 14 and 16, respectively, via a switch 49, which is connected to the control device 48. In some operating modes, the electrical machines 14 and 16, respectively, may also operate each other. Electric power is then led from one of the electrical machines 14, 16 to the second electrical machine 14, 16 via the switch 49, connected to the electrical machines 14, 16. Thus, it is possible to achieve a power balance between the electrical machines 14, 16. Another computer 53 may also be connected to the control device 48 and the gearbox 2.

The first planetary gear 10 is equipped with a first planetary wheel carrier 50, on which a first set of planetary wheels 52 is mounted. The second planetary gear 12 is equipped with a second planetary wheel carrier 51, on which a second set of planetary wheels 54 is mounted. The first set of planetary wheels 52 interacts with the first internal ring gear 22 and the first sun wheel 26. The second set of planetary wheels 54 interacts with the second internal ring gear 28 and the second sun wheel 32. The input shaft 8 of the gearbox 2 is connected with the first planetary wheel carrier 50.

A first coupling device 56 is arranged between the first sun wheel 26 and the first planetary wheel carrier 50. By arranging the first coupling device 56 in such a way that the first sun wheel 26 and the first planetary wheel carrier 50 are connected with each other, and may therefore not rotate in relation to each other, the first planetary wheel carrier 50 and the first sun wheel 26 will rotate with equal rotational speeds.

A second coupling device 58 is arranged between the second sun wheel 32 and the second planetary wheel carrier 51. By arranging the second coupling device 58 in such a way that the second sun wheel 32 and the second planetary wheel carrier 51 are connected with each other, and may therefore not rotate in relation to each other, the second planetary wheel carrier 51 and the first sun wheel 32 will rotate with equal rotational speeds.

Preferably, the first and second coupling devices 56, 58 comprise a first and a second splines-equipped coupling sleeve 55 and 57, respectively, which is axially shiftable on a splines-equipped section on the first and second, respectively, planetary wheel carrier 50 and 51, and on a splines-equipped section on the respective sun wheels 26 and 32. By shifting the respective coupling sleeve 55, 57 so that the splines-equipped sections are connected via the respective coupling sleeves 55, 57, the first planetary wheel carrier 50 and the first sun wheel 26, as well as the second planetary wheel carrier 51 and the second sun wheel 32, respectively, become mutually interlocked with each other and may not rotate in relation to each other.

The first and second coupling device 56, 58 according to the embodiment displayed in FIG. 2 are arranged between the first sun wheel 26 and the first planetary wheel carrier 50, and between the second sun wheel 28 and the second planetary wheel carrier 51, respectively. However, it is possible to arrange an additional or alternative coupling device (not displayed) between the first internal ring gear 22 and the first planetary wheel carrier 50, and also to arrange an additional or alternative coupling device (not displayed) between the second internal ring gear 28 and the second planetary wheel carrier 51.

The first planetary wheel carrier 50 in the first planetary gear 10 is, in this embodiment, fixedly connected with the second sun wheel 32 of the second planetary gear 12.

A transmission device 19, which comprises a first gear pair 60, arranged between the first planetary gear 10 and the output shaft 20 is connected to the first and the second main shaft 34, 36. The first gear pair 60 comprises a first pinion gear 62 and a first cogwheel 64, which are in engagement with each other. A second gear pair 66 is arranged between the second planetary gear 12 and the output shaft 20. The second gear pair 66 comprises a second pinion gear 68 and a second cogwheel 70, which are in engagement with each other. A third gear pair 72 is arranged between the first planetary gear 10 and the output shaft 20. The third gear pair 72 comprises a third pinion gear 74 and a third cogwheel 76, which are in engagement with each other. A fourth gear pair 78 is arranged between the second planetary gear 12 and the output shaft 20. The fourth gear pair 78 comprises a fourth pinion gear 80 and a fourth cogwheel 82, which are in engagement with each other.

On the first main shaft 34, the first and the third pinion gears 62 and 74, respectively, are arranged. The first and the third pinion gears 62 and 74, respectively, are fixedly connected with the first main shaft 34, so that they may not rotate in relation to the first main shaft 34. On the second main shaft 36, the second and the fourth pinion gears 68 and 80, respectively, are arranged. The second and the fourth pinion gears 68 and 80, respectively, are fixedly connected with the second main shaft 36, so that they may not rotate in relation to the second main shaft 36.

The countershaft 18 extends substantially in parallel with the first and the second main shaft 34 and 36, respectively. On the countershaft 18, the first, second, third and fourth cogwheels 64, 70, 76 and 82, respectively, are mounted. The first pinion gear 62 engages with the first cogwheel 64, the second pinion gear 68 engages with the second cogwheel 70, the third pinion gear 74 engages with the third cogwheel 76 and the fourth pinion gear 80 engages with the fourth cogwheel 82.

The first, second, third and fourth cogwheels 64, 70, 76 and 82, respectively, may be individually locked with and released from the countershaft 18 with the assistance of the first, second, third and fourth coupling elements 84, 86, 88 and 90, respectively. The coupling elements 84, 86, 88 and 90, respectively, preferably consist of splines-equipped sections on the cogwheels 64, 70, 76 and 82, respectively, and on the countershaft 18, which interact with fifth and sixth coupling sleeves 83, 85 which engage mechanically with the splines-equipped sections of the respective first to fourth cogwheel 64, 70, 76 and 82 and of the countershaft 18. The first and third coupling elements 84, 88 are preferably equipped with a common coupling sleeve 83, and the second and fourth coupling elements 86, 90 are preferably equipped with a common coupling sleeve 85. In the released state, a relative rotation may occur between the cogwheels 64, 70, 76 and 82 and of the countershaft 18. The coupling elements 84, 86, 88 and 90, respectively, may also consist of friction clutches. On the countershaft 18 a fifth cogwheel 92 is also arranged, which engages with a sixth cogwheel 94, which is arranged on the output shaft 20 of the gearbox 2.

The countershaft 18 is arranged between the respective first and second planetary gears 10, 12 and the output shaft 20, so that the countershaft 18 is connected with the output shaft 20 via a fifth gear pair 21, which comprises the fifth and the sixth cogwheel 92, 94. The fifth cogwheel 92 is arranged so it may be connected with and disconnected from the countershaft 18 with a fifth coupling element 93.

By disconnecting the fifth cogwheel 92, which is arranged to be disconnectable from the countershaft 18, it is possible to transfer torque from the second planetary gear 12 to the countershaft 18 via, for example, the second gear pair 66, and to further transfer torque from the countershaft 18 to the output shaft 20 via, for example, the first gear pair 60. Thus, a number of gear steps is obtained, wherein torque from one of the planetary gears 10, 12 may be transferred to the countershaft 18, and further along from the countershaft 18 to the main shaft 34, 36 connected with the second planetary gear 10, 12, finally to transfer torque to the output shaft 20 of the gearbox 2. This presumes, however, that a coupling mechanism 96 arranged between the first main shaft 34 and the output shaft 20 is connected, which is described in more detail below.

The fifth cogwheel 92 may be locked to and released from the countershaft 18 with the assistance of a fifth coupling element 93. The coupling element 93 preferably consists of splines-equipped sections adapted on the fifth cogwheel 92 and the countershaft 18, which sections interact with a ninth coupling sleeve 87, which engages mechanically with the splines-equipped sections of the fifth cogwheel 92 and the countershaft 18. In the released state, a relative rotation may occur between the fifth cogwheel 92 and the countershaft 18. The fifth coupling element 93 may also consist of friction clutches.

Torque transfer from the input shaft 8 of the gearbox 2 to the output shaft 20 of the gearbox 2 may occur via the first or the second planetary gear 10 and 12, respectively, and the countershaft 18. The torque transfer may also occur directly via the first planetary gear 10, whose first sun wheel 26 is connected, via the first main shaft 34, to the output shaft 20 of the gearbox 2 via a coupling mechanism 96. The coupling mechanism 96 preferably comprises a splines-equipped seventh coupling sleeve 100, which is axially shiftable on the first main shaft 34 and on the splines-equipped sections of the output shaft 20. By shifting the seventh coupling sleeve 100, so that the splines-equipped sections are connected via the seventh coupling sleeve 100, the first main shaft 34 becomes locked with the output shaft 20, which, when rotating, will therefore have the same rotational speed. By disconnecting the fifth cogwheel 92 of the fifth gear pair 21 from the countershaft 18, torque from the second planetary gear 12 may be transferred to the countershaft 18, and further along from the countershaft 18 to the first main shaft 34, connected with the first planetary gear 10, in order finally to transfer torque via the coupling mechanism 96 to the output shaft 20 of the gearbox 2.

During operation, the gearbox 2 may in some operating modes operate so that one of the sun wheels 26 and 32, respectively, are locked with the first and the second planetary wheel carrier 50 and 51, respectively, with the help of the first and the second coupling device 56 and 58, respectively. The first and the second main shaft 34 and 36, respectively, then obtain the same rotational speed as the input shaft 8 of the gearbox 2, depending on which sun wheel 26 and 32, respectively, is locked with the respective planetary wheel carriers 50 and 51. One or both of the electrical machines 14 and 16, respectively, may operate as a generator to generate electric power to the energy storage device 46. Alternatively, the electrical machine 14 and 16, respectively, may provide a torque injection, in order to thus increase the torque in the output shaft 20. At some operating times, the electrical machines 14 and 16, respectively, will supply each other with electric power, independently of the energy storage device 46.

It is also possible that both the first and the second electrical machine 14 and 16, respectively, generate power to the energy storage device 46. At engine braking the driver releases the accelerator pedal (not displayed) of the vehicle 1. The output shaft 20 of the gearbox 2 then operates one or both electrical machines 14 and 16, respectively, while the combustion engine 4 and the electrical machines 14 and 16, respectively, engine brake. The electrical machines 14 and 16, respectively, in this case generate electric power, which is stored in the energy storage device 46 in the vehicle 1. This operating state is referred to as regenerative braking. In order to further reinforce the effect of deceleration, the output shaft 97 of the combustion engine 4 may be locked and therefore prevented from rotating. Thus, only one of or both the electrical machines 14 and 16, respectively, will function as brakes and 16 generate electric power, which is stored in the energy storage device 46. The locking of the output shaft 97 of the combustion engine 4 may also be carried out when the vehicle must accelerate by only one or both the electrical machines 14 and 16, respectively. If the torque of one or both of the respective electrical machines 14 and 16 overcomes the torque off the combustion engine 4, and having regard to the gearing between them, the combustion engine 4 will not be able to resist the large torque which the respective electrical machines 14 and 16 generate, so that it becomes necessary to lock the output shaft 97 of the combustion engine's 4. The locking of the output shaft 97 of the combustion engine 4 is preferably carried out with a locking device 102, which is arranged between the first planetary wheel carrier 50 and the gear hosing 42. By locking the first planetary wheel carrier 50 and the gear housing 42, the output shaft 97 of the combustion engine 4 will also be locked, since the output shaft 97 of the combustion engines 4 is connected with the first planetary wheel carrier 50 via the input shaft 8 of the gearbox. The locking device 102 preferably comprises a splines-equipped eighth coupling sleeve 104, which is axially shiftable on a splines-equipped section of the first planetary wheel carrier 50, and on a splines-equipped section of the gear housing. By shifting the eight coupling sleeve 104 so that the splines-equipped sections are connected via the coupling sleeve 104, the first planetary wheel carrier 50, and therefore the output shaft 97 of the combustion engine 4 is prevented from rotating.

The control device 48 is connected to the electrical machines 14 and 16, respectively, to control the respective electrical machines 14 and 16, so that they, during certain operating times, use stored electric power to supply driving power to the output shaft 20 of the gearbox 2, and during other operating times use the kinetic energy of the output shaft 20 of the gearbox 2 to extract and store electric power. The control device 48 thus detects the rotational speed and/or the torque of the output shaft 97 of the combustion engine 4 via sensors 98 arranged at the electrical machines 14 and 16, respectively, and in the output shaft 20 of the gearbox 2, in order thus to gather information and to control the electrical machines 14 and 16, respectively, to operate as electric motors or generators. The control device 48 may be a computer with software suitable for this purpose. The control device 48 also controls the flow of power between the energy storage device 46 and the respective stators 40 and 44 of the electrical machines 14 and 16, respectively. At times when the electrical machines 14 and 16, respectively, operate as engines, stored electric power is supplied from the energy storage device 46 to the respective stators 40 and 44. At times when the electrical machines 14 and 16 operate as generators electric power is supplied from the respective stators 40 and 44 to the energy storage device 46. However, as stated above, the electrical machines 14 and 16, respectively, may, during certain operating times, supply each other with electric power, independently of the energy storage device 46.

The first and the second coupling devices 56 and 58, respectively, the first, second, third, fourth and fifth coupling elements 84, 86, 88, 90 and 93, respectively, the coupling mechanism 96 between the first main shaft 34 and the output shaft 20, and the locking device 102 between the first planetary wheel carrier 50 and the gear housing 42, are connected to the control device 48 via their respective coupling sleeves. These components are preferably activated and deactivated by electric signals from the control device 48. The coupling sleeves are preferably shifted by non-displayed power elements, such as hydraulically or pneumatically operated cylinders. It is also possible to shift the coupling sleeves with electrically powered power elements.

The example embodiment in FIG. 2 shows four pinion gears 62, 68, 74 and 80, respectively, and four cogwheels 64, 70, 76 and 82, respectively, and two respective planetary gears 10 and 12, with associated electrical machines 14 and 16, respectively. However, it is possible to adapt the gearbox 2 with more or fewer pinion gears and cogwheels, and with more planetary gears with associated electrical machines.

Below, an up-shift from a first to a seventh gear will be described, wherein the gearbox 2 is arranged in a vehicle 1 and the vehicle is propelled by the combustion engine 4. The description of the up-shift will comprise components that are not displayed in the simplified FIG. 3, but which are displayed in FIG. 2.

The input shaft 8 of the gearbox 2 is connected to the output shaft 97 of the vehicle's 1 combustion engine 4. The output shaft 20 of the gearbox 2 is connected to a driving shaft 99 in the vehicle 1. At idling of the combustion engine 4 and when the vehicle 1 is at a standstill, the input shaft 8 of the gearbox 2 rotates at the same time as the output shaft 20 of the gearbox 2 is at a standstill. The locking device 102 is deactivated, so that the output shaft 97 of the combustion engine 4 may rotate freely. Since the input shaft 8 of the gearbox 2 rotates, the first planetary wheel carrier 50 will also rotate, which entails that the first set of planetary wheels 52 will rotate. Since the first planetary wheel carrier 50 is connected to the second sun wheel 32, the second sun wheel 32, and thus also the second set of planetary wheels 54, will rotate. By not supplying power to the first and the second electrical machines 14 and 16, respectively, the first and the second internal rings 22 and 28, respectively, which are connected with the respective first and second rotor 24 and 30 of the electrical machines 14 and 16, respectively, will rotate freely, so that no torque is absorbed by the respective internal rings 22 and 28. The first and the second coupling devices 56 and 58, respectively, are disconnected and thus not actuated. Thus, no torque will be transferred from the combustion engine 4 to the sun wheel 26 of the first planetary gear 10 or to the planetary wheel carrier 51 of the second planetary gear 12. The coupling mechanism 96 between the first main shaft 34 and the output shaft 20 is disconnected, so that the first main shaft 34 and the output shaft 20 may rotate freely in relation to each other. Since the first planetary gear's sun wheel 26, the planetary wheel carrier 51 of the second planetary gear 12 and the output shaft 20 of the gearbox 2 are, at this stage, at a standstill, the countershaft 18 is also at a standstill. In a first step the fourth cogwheel 82 and the third cogwheel 76 are connected with the countershaft 18 with the assistance of the fourth and third coupling elements 90 and 88, respectively. The first cogwheel 64 and the second cogwheel 70 are disconnected from the countershaft 18. Thus, the first cogwheel 64 and the second cogwheel 70 are allowed to rotate freely in relation to the countershaft 18. The fifth cogwheel 92 of the fifth gear pair 21 is locked on the countershaft 18 with the assistance of the fifth coupling element 93.

In order to start the rotation of the output shaft 20 of the gearbox 2, with the objective of driving the vehicle 1, the fourth pinion gear 80 and the fourth cogwheel 82 on the countershaft 18 must be brought to rotate. This is achieved by making the second planetary wheel carrier 51 rotate. When the second planetary wheel carrier 51 rotates, the second main shaft 36 will also rotate and thus the fourth pinion gear 80, which is arranged on the second main shaft 36, also rotates. The second planetary wheel carrier 51 is made to rotate by controlling the second internal ring gear 28 with the second electrical machine 16. By activating the second electrical machine 16 and controlling the combustion engine 4 to a suitable engine speed, the vehicle 1 begins to move as the second main shaft 36 begins to rotate. When the second planetary wheel carrier 51 and the second sun wheel 32 achieve the same rotational speed, the second sun wheel 32 is locked with the second planetary wheel carrier 51 with the assistance of the second coupling device 58. As mentioned above, the second coupling device 58 is preferably adapted in such a way that the second sun wheel 32 and the second planetary wheel carrier 51 engage mechanically with each other. Alternatively, the second coupling device 58 may be adapted as a slip brake or a multi-plate coupling which connects, in a smooth way, the second sun wheel 32 with the second planetary wheel carrier 51. When the second sun wheel 32 is connected with the second planetary wheel carrier 51, the second planetary wheel carrier 51 will rotate with the same rotational speed as the output shaft 97 of the combustion engine 4. Thus, the torque generated by the combustion engine 4 is transferred to the output shaft 20 of the gearbox 2 via the fourth pinion gear 80, the fourth cogwheel 82 on the countershaft 18, the fifth cogwheel 92 on the countershaft 18, and the sixth cogwheel 94 on the output shaft 20 of the gearbox 2. The vehicle 1 will thus begin to move off and be propelled by a first gear.

Each of the first, second, third and fourth gear pairs 60, 66, 72, 78 has a gearing, which is adapted to the vehicle's 1 desired driving characteristics. According to the example embodiment displayed in FIG. 2, the fourth gear pair 78 has the highest gearing compared to the first, second and third gear pairs 60, 66, 72, which results in the fourth gear pair 78 being connected when the lowest gear is engaged. The second gear pair 66 transfers, as does the fourth gear pair 78, torque between the second main shaft 36 and the countershaft 18, and could instead be fitted out with the highest gearing, compared with other gear pairs 60, 72, 78, which is why in such an embodiment the second gear pair 66 could be connected when the lowest gear is engaged.

When the countershaft 18 is made to rotate by the fourth cogwheel 82 on the countershaft 18, the third cogwheel 76 on the countershaft 18 will also rotate. Thus, the countershaft 18 operates the third cogwheel 76, which in turn operates the third pinion gear 74 on the first main shaft 34. When the first main shaft 34 rotates, the first sun wheel 26 will also rotate, and thus, depending on the rotational speed of the output shaft 97 of the combustion engine 4 and thus the rotational speed of the first planetary wheel carrier 50, it will cause the first internal ring gear 22 and the first rotor 24 of the first electrical machine 14 to rotate. It is thus possible to allow the first electrical machine 14 to operate as a generator to supply power to the energy storage device 46, and/or to supply power to the second electrical machine 16. It is also possible for the second electrical machine 16 to be operated as a generator. Alternatively, the first electrical machine 14 may emit a torque injection, by way of the control device 48 controlling the first electrical machine 14 to provide a driving torque.

In order to shift from a first to a second gear, the locking between the second sun wheel 32 and the second planetary wheel carrier 51 must cease, which is achieved by way of the first and/or the second electrical machine 14, 16 being controlled in such a way that torque balance arises in the second planetary gear 12. Subsequently, the second coupling device 58 is controlled, so that it disconnects the second sun wheel 32 and the second planetary wheel carrier 51 from each other. The second gear is connected by way of the control device 48, controlling the first electrical machine 14, so that a synchronous rotational speed arises between the first planetary wheel carrier 50 and the first sun wheel 26, in order to achieve a locking between the first planetary wheel carrier 50 and the first sun wheel 26. This is achieved by way of controlling the first coupling device 56 in such a way that the first planetary wheel carrier 50 and the first sun wheel 26 are mechanically connected with each other. Alternatively, the first coupling device 56 may be adapted as a slip brake or a multi-plate clutch which connects, in a smooth way, the first sun wheel 26 with the first planetary wheel carrier 50. By synchronizing the control of the combustion engine 4 and the second and first electrical machine 14 and 16, respectively, a soft and disruption-free transition from a first to a second gear may be carried out.

The first main shaft 34 now rotates, operated by the output shaft 97 of the combustion engine 4, and the first main shaft 34 now operates the third pinion gear 74. The first planetary wheel carrier 50 thus operates the third pinion gear 74 via the first sun wheel 26 and the first main shaft 34. Since the third cogwheel 76 is in engagement with the third pinion gear 74 and is connected with the countershaft 18, the third cogwheel 76 will operate the countershaft 18, which in turn operates the fifth cogwheel 92 on the countershaft 18. The fifth cogwheel 92 in turn operates the output shaft 20 of the gearbox 2 via the sixth cogwheel 94, which is arranged on the output shaft 20 of the gearbox 2. The vehicle 1 is now operated with a second gear.

When the countershaft 18 is made to rotate by the third cogwheel 76, the fourth cogwheel 82 will also rotate. Thus, the countershaft 18 operates the fourth cogwheel 82, which in turn operates the fourth pinion gear 80 on the second main shaft 36. When the second main shaft 36 rotates, the second planetary wheel carrier 51 will also rotate, and thus, depending on the rotational speed of the output shaft 97 of the combustion engine 4, and thus the rotational speed in the first planetary wheel carrier 50, it will cause the second internal ring gear 28 and the second rotor 30 of the second electrical machine 16 to rotate. It is thus possible to allow the second electrical machine 16 to operate as a generator to supply power to the energy storage device 46, and/or to supply power to the first electrical machine 14. The second electrical machine 16 may also emit a torque injection, by way of the control device 48 controlling the second electrical machine 16 to provide a propulsion torque.

In order to shift from a second gear to a third gear, the fourth cogwheel 82 on the countershaft 18 must be disconnected from the countershaft 18 with the fourth coupling element 90, so that the fourth cogwheel 82 may rotate freely in relation to the countershaft 18. Subsequently, the countershaft 18 is connected with the second cogwheel 70 on the countershaft 18 via the second coupling element 86. In order to achieve a connection of the countershaft 18 and the second cogwheel 70 on the countershaft 18, preferably the second electrical machine 16 is controlled in such a way that a synchronous rotational speed arises between the countershaft 18 and the second cogwheel 70 on the countershaft 18. A synchronous rotational speed may be determined by way of measuring the rotational speed of the second rotor 30 in the second electrical machine 16, and by measuring the rotational speed of the output shaft 20. Thus, the rotational speed in the second main shaft 36 and the rotational speed in the countershaft 18 may be determined by way of given gear ratios. The rotational speed of the respective shafts 18, 36 is controlled, and when a synchronous rotational speed has arisen between the countershaft 18 and the second cogwheel 70, the countershaft 18 and the second cogwheel 70 are connected with the assistance of the second coupling element 86.

In order to complete the shift from a second gear to a third gear, the locking between the first sun wheel 26 and the first planetary wheel carrier 50 must cease, which is achieved by way of controlling the second electrical machine 16 in such a way that torque balance arises in the first planetary gear 10, following which the first coupling device 56 is controlled, so that it disconnects the first sun wheel 26 and the first planetary wheel carrier 50 from each other. Subsequently, the combustion engine 4 is controlled in such a way that a synchronous rotational speed arises between the second sun wheel 32 and the second planetary wheel carrier 51, so that the second coupling device 58 may be engaged in order thus to connect the second sun wheel 32 with the second planetary wheel carrier 51, via the coupling sleeve 57. By synchronizing the control of the combustion engine 4 and the second and first electrical machine 14 and 16, respectively, a soft and disruption-free transition from a second to a third gear may be carried out.

The third cogwheel 76 is disconnected by controlling the first electrical machine 14 in such a way that a substantially zero torque state arises between the countershaft 18 and the third cogwheel 76. When a substantially zero torque state arises, the third cogwheel 76 is disconnected from the countershaft 18 by controlling the third coupling element 88, so that it releases the third cogwheel 76 from the countershaft 18. Subsequently, the first electrical machine 14 is controlled in such a way that a synchronous rotational speed arises between the countershaft 18 and the first cogwheel 64. When a synchronous rotational speed arises, the first cogwheel 64 is connected to the countershaft 18 by way of controlling the first coupling element 84, so that it connects the first cogwheel 64 on the countershaft 18. A synchronous rotational speed may be achieved, since the rotational speed of the first rotor 24 in the first electrical machine 14 is measured, and the rotational speed of the output shaft 20 is measured, following which the rotational speeds of the shafts 18, 34 are controlled in such a way that a synchronous rotational speed arises. Thus, the rotational speed of the first main shaft 34 and the rotational speed of the countershaft 18 may be determined by way of given gear ratios.

The second main shaft 36 now rotates with the same rotational speed as the output shaft 97 of the combustion engine 4, and the second main shaft 36 now operates the second pinion gear 68 via the second main shaft 36. Since the second cogwheel 70 is in engagement with the second pinion gear 68 and is connected with the countershaft 18, the second cogwheel 70 will operate the countershaft 18, which in turn operates the fifth cogwheel 92 on the countershaft 18. The fifth cogwheel 92 in turn operates the output shaft 20 of the gearbox 2 via the sixth cogwheel 94, which is arranged on the output shaft 20 of the gearbox 2. The vehicle 1 is now driven in a third gear.

When the countershaft 18 is made to rotate by the second cogwheel 70 on the countershaft 18, the first cogwheel 64 on the countershaft 18 will also rotate. Thus, the countershaft 18 operates the first cogwheel 64, which in turn operates the first pinion gear 62 on the first main shaft 34. When the first main shaft 34 rotates, the first sun wheel 26 will also rotate, and thus, depending on the rotational speed of the output shaft 97 of the combustion engine 4, and thus the rotational speed of the first planetary wheel carrier 50, it will cause the first internal ring gear 22 and the first rotor 24 of the second electrical machine 16 to rotate. It is thus possible to allow the first electrical machine 14 operate as a generator to supply power to the energy storage device 46, and/or to supply power to the second electrical machine 16. Alternatively, the first electrical machine 14 may emit a torque injection, by way of the control device 48 controlling the first electrical machine 14 to provide a driving torque.

In order to complete the shift from the third to the fourth gear, the locking between the second sun wheel 32 and the second planetary wheel carrier 51 must cease, which is achieved by way of controlling the first electrical machine 14 in such a way that torque balance arises in the second planetary gear 12, following which the second coupling device 58 is controlled, so that it disconnects the second sun wheel 32 and the second planetary wheel carrier 51 from each other. A fourth gear is subsequently connected by way of the control device 48 controlling the combustion engine 4, in such a way that a synchronous rotational speed arises between the first planetary wheel carrier 50 and the first sun wheel 26, in order to achieve a locking between the first planetary wheel carrier 50 and the first sun wheel 26. This is achieved by way of controlling the first coupling device 56 in such a way that the first planetary wheel carrier 50 and the first sun wheel 26 are mechanically connected with each other. By synchronizing the control of the combustion engine 4 and the second and first electrical machine 14 and 16 a soft and disruption-free transition from a third to a fourth gear may be carried out.

The first main shaft 34 now rotates and is operated by the output shaft 97 of the combustion engine 4 and the first main shaft 34 now operates the first pinion gear 62. The first planetary wheel carrier 50 thus operates the first pinion gear 62 via the first sun wheel 26 and the first main shaft 34. Since the first cogwheel 64 is in engagement with the first pinion gear 62 and is connected with the countershaft 18, the first cogwheel 64 will operate the countershaft 18, which in turn operates the fifth cogwheel 92 on the countershaft 18. The fifth cogwheel 92 in turn operates the output shaft 20 of the gearbox 2 via the sixth cogwheel 94, which is arranged on the output shaft 20 of the gearbox 2. The vehicle 1 is now driven in a fourth gear.

When the countershaft 18 is made to rotate by the first cogwheel 64, the second cogwheel 70 will also rotate. Thus, the countershaft 18 operates the second cogwheel 70, which in turn operates the second pinion gear 68 on the second main shaft 36. When the second main shaft 36 rotates, the second planetary wheel carrier 51 will also rotate, and thus, depending on the rotational speed of the output shaft 97 of the combustion engine 4, and thus the rotational speed in the first planetary wheel carrier 50, it will cause the second internal ring gear 28 and the second rotor 30 of the second electrical machine 16 to rotate. It is thus possible to allow the second electrical machine 16 to operate as a generator to supply power to the energy storage device 46, and/or to supply power to the first electrical machine 14. The second electrical machine 16 may also emit a torque injection, by way of the control device 48 controlling the second electrical machine 16 to provide a propulsion torque.

In order to shift gears from a fourth gear to a fifth gear, the first cogwheel 64 must be disengaged from the countershaft 18, so that the fourth gear is disengaged. This is achieved by way of controlling the combustion engine 4 and the first electrical machine 14, in such a way that the first cogwheel 64 is brought to a substantially zero torque state in relation to the countershaft 18. When a substantially zero torque state has arisen, the first coupling element 84 is disengaged, so that the first cogwheel 64 is disconnected from the countershaft 18.

Subsequently, the rotational speed of the first main shaft 34 is synchronized with the rotational speed of the output shaft 20, following which the coupling mechanism 96 is controlled in such a way that it connects the first main shaft 34 with the output shaft 20.

Subsequently, the combustion engine 4 and the first electrical machine 14 are controlled in such a way that the propulsion torque occurs via the first main shaft 34 and via the coupling mechanism 96, and further along to the output shaft 20. By reducing the torque from the second electrical machine 16, the fifth coupling element 93 may be brought to a substantially zero torque state in relation to the countershaft 18. When a substantially zero torque state has arisen, the fifth coupling element 93 is disengaged, so that the fifth cogwheel 92 of the fifth gear pair 21 is disconnected from the countershaft 18.

Subsequently, with the help of the second electrical machine 16, the rotational speed of the countershaft 18 is synchronized with the rotational speed of the third cogwheel 76, following which the third coupling element 88 is controlled in such a way that it connects the third cogwheel 76 with the countershaft 18. When this connection has been completed, the propulsion torque may be shared between the combustion engine 4, the first electrical machine 14 and the second electrical machine 16. Subsequently, torque balance is created in the first planetary gear 10, following which the first coupling device 56 disconnects the first planetary wheel carrier 50 and the first sun wheel 26 from each other. Finally, the second planetary wheel carrier 51 is rotational speed synchronized with the second sun wheel 32, following which the second coupling device 58 connects the second planetary wheel carrier 51 and the second sun wheel 32 with each other.

The second main shaft 36 now rotates, operated by the output shaft 97 of the combustion engine 4, and the second main shaft 36 operates the second pinion gear 68. Since the second cogwheel 70 is in engagement with the second pinion gear 68 and is connected with the countershaft 18 via the second coupling element 86, the second cogwheel 70 will operate the countershaft 18, which in turn operates the third cogwheel 76 on the countershaft 18. The third cogwheel 76 in turn operates the first main shaft 34 via the third pinion gear 74, and the output shaft 20 of the gearbox 2 is thus operated via the coupling mechanism 96, which connects the first main shaft 34 and the output shaft 20 of the gearbox 2. The vehicle 1 is now driven in a fifth gear.

In order to shift from a fifth to a sixth gear, the locking between the second sun wheel 32 and the second planetary wheel carrier 51 must cease, which is achieved by way of controlling the first and/or the second electrical machine 14, 16 in such a way that torque balance arises in the second planetary gear 12, following which the second coupling device 58 is controlled, so that it disconnects the second sun wheel 32 and the second planetary wheel carrier 51 from each other. A sixth gear is subsequently connected by way of the control device 48 controlling the combustion engine 4, in such a way that a synchronous engine speed arises between the first planetary wheel carrier 50 and the first sun wheel 26, in order to achieve a locking between the first planetary wheel carrier 50 and the first sun wheel 26. This is achieved by way of controlling the first coupling device 56 in such a way that the first planetary wheel carrier 50 and the first sun wheel 26 are mechanically connected with each other. By synchronizing the control of the second and first electrical machines 14 and 16, respectively, a soft and disruption-free transition from a fifth to a sixth gear may be carried out.

The first main shaft 34 now rotates operated by the output shaft 97 of the combustion engine 4, whereat the first main shaft 34 operates the output shaft 20 of the gearbox 2 via the coupling mechanism 96, which connects the first main shaft 34 and the output shaft 20 of the gearbox 2. The vehicle 1 is now driven in a sixth gear.

In order to shift from a sixth to a seventh gear, the third cogwheel 76 on the countershaft 18 must first be disconnected from the countershaft 18 with the third coupling element 88, so that the third cogwheel 76 may rotate freely in relation to the countershaft 18. Subsequently, the countershaft 18 is connected with the first cogwheel 64 on the countershaft 18 via the first coupling element 84. When the countershaft 18 and the first cogwheel 64 on the countershaft 18 have a synchronous rotational speed, the first coupling element 84 is controlled in such a way that the first cogwheel 64 and the countershaft 18 are connected.

In order to complete the shift from a sixth gear to a seventh gear, the locking between the first sun wheel 26 and the first planetary wheel carrier 50 must cease, which is achieved by way of controlling the second electrical machine 16 in such a way that torque balance arises in the first planetary gear 10, following which the first coupling device 56 is controlled, so that it disconnects the first sun wheel 26 and the first planetary wheel carrier 50 from each other. Subsequently, the combustion engine 4 is controlled in such a way that a synchronous rotational speed arises between the second sun wheel 32 and the second planetary wheel carrier 51, so that the second coupling device 58 may be engaged in order thus to connect the second sun wheel 32 with the second planetary wheel carrier 51, via the coupling sleeve 57. By synchronizing the control of the combustion engine 4 and the second and first electrical machine 14 and 16, respectively, a soft and disruption-free transition from a sixth to a seventh gear may be carried out.

The second main shaft 36 now rotates with the same rotational speed as the output shaft 97 of the combustion engine 4, and the second main shaft 36 operates the second pinion gear 68. Since the second cogwheel 70 is in engagement with the second pinion gear 68 and is connected with the countershaft 18, the second cogwheel 70 will operate the countershaft 18, which in turn operates the fifth cogwheel 64 on the countershaft 18. The first cogwheel 64 in turn operates the first main shaft 34 via the first pinion gear 62, and the output shaft 20 of the gearbox 2 is thus operated via the coupling mechanism 96, which connects the first main shaft 34 and the output shaft 20 of the gearbox 2. The vehicle 1 is now driven in a seventh gear.

According to the embodiment above, the gearbox 2 comprises pinion gears 62, 68, 74, 80 and cogwheels 64, 70, 76, 82 arranged on the main shafts 34, 36 and the countershaft 18, respectively, to transfer rotational speed and torque. However, it is possible to use another type of transmission, such as chain and belt drives, to transfer rotational speed and torque in the gearbox 2.

The transmission device 19 has four gear pairs 60, 66, 72, 78 according to the example embodiment. However, the transmission device 19 may comprise any number of gear pairs.

Figure 3:
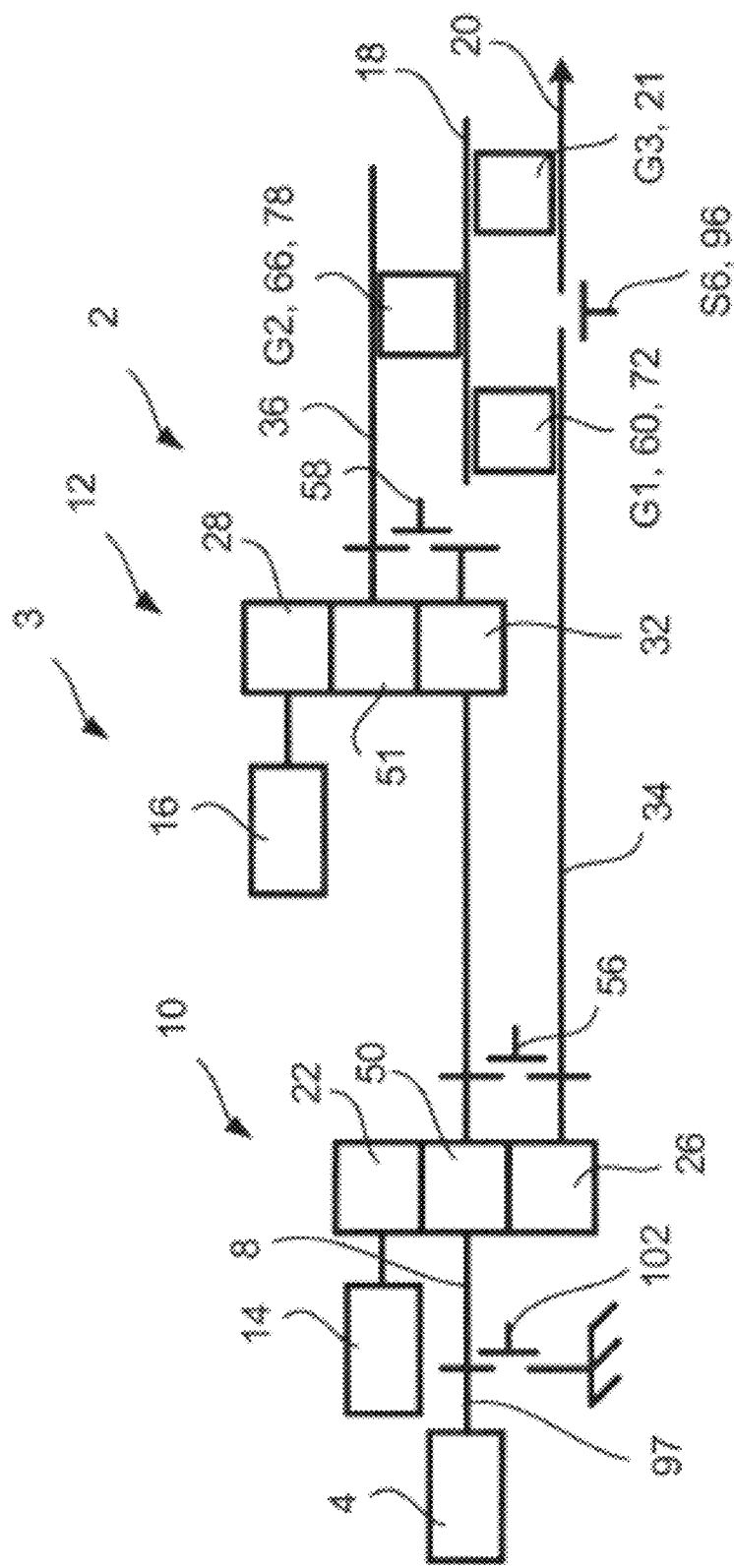
FIG. 3 shows a simplified schematic view of the hybrid powertrain in FIG. 2.

FIG. 3 illustrates the hybrid powertrain 3 according to FIG. 2 in a simplified view, where some components have been excluded in the interest of clarity. G1 in FIG. 3 consists of at least one gear pair connected with the first main shaft 34 and therefore with the first planetary gear 10, and a gear pair G2 consists of at least one gear pair connected with the second main shaft 36 and therefore with the second planetary gear 12. These gear pairs G1, G2 are also connected to the output shaft 20. These gear pairs G1, G2 are suitably connected to the output shaft 20, via the countershaft 18. G1 and G2, respectively, may consist of one or several gear pairs. The gear pair G1, connected with the first planetary gear 10, may for example consist of the first gear pair 60 and/or the third gear pair 72, as described in FIG. 2. The gear pair G2, connected with the second planetary gear 12, may for example consist of the second gear pair 66 and/or the fourth gear pair 78, as described in FIG. 2. Further, at least one gear pair G3, connected with the output shaft 20 and the countershaft, 18 is displayed, which may consist of the fifth gear pair 21 described in FIG. 2. G3 may consist of one or several gear pairs. Alternatively, torque may be extracted directly from the countershaft 18, which thus constitutes the output shaft.

The at least one gear pair G1, 60, 72, connected with the first planetary gear 10 comprises at least one pinion gear 62, 74 and one cogwheel 64, 76 arranged in engagement with each other, which pinion gear 62, 74 may be arranged in such a way that it may be connected with and disconnected from the main shaft 34, arranged with the first planetary gear 10. The at least one cogwheel 64, 76 may be arranged so that it may be connected with and disconnected from the countershaft 18.

The at least one gear pair G2, 66, 78, connected with the second planetary gear 12, comprises at least one pinion gear 68, 80 and one cogwheel 70, 82 arranged in engagement with each other, which pinion gear 68, 80 may be arranged in such a way that it may be connected with and disconnected from the second main shaft 36, arranged with the first planetary gear 12. The at least one cogwheel 70, 82 may be arranged so that it may be connected with and disconnected from the countershaft 18.

Below is a description of an embodiment to control the hybrid powertrain 3, in order to achieve a desired favorable engine speed in a combustion engine 4, arranged in the hybrid powertrain, independently of the hybrid powertrain's 3 rotational speed. The hybrid drive line 3 comprises a combustion engine 4; a gearbox 2 with an input shaft 8 and an output shaft 20; a first planetary gear 10, connected to the input shaft 8 and a first main shaft 34; a second planetary gear 12, connected to the first planetary gear 10 and a second main shaft 36; a first electrical machine 14, connected to the first planetary gear 10; a second electrical machine 16, connected to the second planetary gear 12; at least one gear pair G1, 60, 72, connected with the first main shaft 34, and therefore with the first planetary gear 10 and the output shaft 20; and at least one gear pair G2, 66, 78, connected with the second main shaft 36, and therefore with the second planetary gear 12 and the output shaft 20, wherein the combustion engine 4 is connected with the input shaft 8 of the gearbox 2.

In cases, where the hybrid drive line is arranged in a vehicle and there is a wish to control the engine speed of the combustion engine independently of the vehicle's speed, two rotatable components 22, 26, 50 in the first planetary gear 10 must be connected with each other. If this is not the case, and the rotatable components 22, 26, 50 of the first planetary gear 10 consist of a first planetary wheel carrier 50 and a first sun wheel 26, the connection is achieved by way of controlling the combustion engine 4, in such a way that a synchronous rotational speed is achieved between the first planetary wheel carrier 50 and the first sun wheel 26, following which a first coupling device 56 is shifted, so that the first planetary wheel carrier 50 and the first sun wheel 26 are connected. Furthermore, it is ensured that all rotatable components 28, 32, 51 of the second planetary gear 12 are disconnected from each other. If this is not the case, and the rotatable components 28, 32, 51 in the second planetary gear 12 consist of a second planetary wheel carrier 51 and a second sun wheel 32, the first and/or the second electrical machine 14, 16 is controlled, in such a way that torque balance is achieved in the second planetary gear 12, following which a second coupling device 58 is shifted, so that the second planetary wheel carrier 51 and the second sun wheel 32 are disconnected from each other. Furthermore, it is ensured that a gear is engaged, which corresponds to the at least one gear pair G2, 66, 78, connected with the second planetary gear 12. If this is not the case, the second electrical machine 16 is controlled in such a way that a synchronous rotational speed is achieved between the gear pair G2, 66, 78, which is connected with the second planetary gear 12, and the countershaft 20, which is connected with the output shaft 18, following which a coupling element 86, 90 is shifted, so that the gear pair G2, 66, 78, which is connected with the second planetary gear 12, and the countershaft 18 are connected. Furthermore, it is ensured that at least one gear pair G1, 60, 72, which is connected with the first planetary gear 10, is disconnected. If this is not the case, the first electrical machine 10 is controlled in such a way that a substantially zero torque state is achieved between the gear pair G1, 60, 72, which is connected with the first planetary gear 10, and the countershaft 20, which is connected with the output shaft 18, following which a coupling element 84, 88 is shifted, so that the gear pair G1, 60, 72, which is connected with the first planetary gear 10, and the countershaft 18 are disconnected. Furthermore, the gear pair G3, 21, which is joined with the output shaft 20 and the countershaft 18, is connected with the countershaft 18. Thus, torque may be transferred from the second planetary gears 12, via the countershaft 18, to the output shaft 20.

The second electrical machine 16 is controlled in such a way that a desired torque $T_{Drv}$ is achieved in the output shaft 20. The combustion engine 4 is controlled to a desired engine speed $n_{ice}$, while the first electrical machine 14 is controlled in such a way that a desired total power consumption $P_{EM}$ for the first and the second electrical machine 14, 16 is achieved. The desired engine speed $n_{ice}$ is preferably determined based on a required power $P_{ice}$ from the combustion engine 4, given the desired torque $T_{Drv}$ in the output shaft 20. Thus, a favorable/desired operating point is achieved for the combustion engine 4.

When the second electrical machine 16 achieves the desired torque $T_{Drv}$, the torque $T_{Drv}$ desired in the output shaft 20 may be obtained from the equation E1 below:

$$T_{Drv} = T_{EM2} \frac{S_2 + R_2}{R_2} \frac{1}{G_2 G_3} \quad [\text{E1}]$$

where $T_{EM2}$ is the torque, which the second electrical machine 16 emits, $S_2$ is the number of cogs on the second sun wheel and $R_2$ is the number of cogs on the second ring gear 28. $G_2$ is the gear ratio between the second main shaft 36 and the countershaft 18, $G_3$ is the gear ratio between the countershaft 18 and the output shaft 20, for the selected connected gear pairs G2, G3. With a known desired torque $T_{Drv}$ in the output shaft 20, the equation E1 may thus be solved to determine the torque $T_{EM2}$, which the second electrical machine 16 must be controlled to emit.

The total power consumption $P_{EM}$ of the first and the second electrical machines 14, 16, excluding losses, may thus be obtained from the equation E2 below:

$$P_{EM} = (T_{EM1} n_{EM1} + T_{EM2} n_{EM2}) \frac{2\pi}{60} \quad [\text{E2}]$$

where $n_{EM1}$ is the first electrical machine's 14 engine speed and $n_{EM2}$ is the second electrical machine's 16 engine speed. With a determined desired power consumption $P_{EM}$, and with the torque $T_{EM2}$ from the second electrical machine 16 determined based on equation E1, equation E2 may be solved in order thus to determine the torque $T_{EM1}$, which the first electrical machine 14 must be controlled to emit. The first electrical machine 14 is suitably controlled having regard to the desired power input or output of an energy storage device 46, and the power consumption of other loads connected to the energy storage device 46.

The power $P_{ice}$ produced by the combustion engine 4 may be obtained from the third equation E3. Where $P_{Drv}$ is the power of the hybrid powertrain 3, which is obtained as a product of the torque $T_{Drv}$ of the output shaft 20 and the engine speed of the output shaft 20. The power $P_{ice}$ produced by the combustion engine 4 is also obtained from equation E4, where $T_{ice}$ is the torque of the combustion engine 4, and $n_{ice}$ is the engine speed of the combustion engine. The combustion engine's 4 torque $T_{ice}$ is obtained from equation E5 below.

$$P_{ice} = P_{Drv} + P_{EM} \quad [\text{E3}]$$

$$P_{ice} = T_{ice} \times n_{ice} \times \frac{2\pi}{60} \quad [\text{E4}]$$

$$T_{ice} = -\frac{(S_1 + R_1) T_{EM1}}{R_1} + \frac{S_2 T_{EM2}}{R_2} \quad [\text{E5}]$$

In order to achieve a required power $P_{ice}$ from the combustion engine 4, the torque and engine speed of the combustion engine 4, and the first and second electrical machines 14, 16 may be varied in different combinations, as found based on the equations E3 and E4 in combination with E1, E2 and E5. One combination is more favorable than the others, and the desired engine speed $n_{ice}$, toward which the combustion engine 4 is controlled, is the most favorable engine speed $n_{ice}$, given the power $P_{ice}$ required and obtained from equation E4. The desired engine speed $n_{ice}$ is favorable among others with respect to fuel consumption, noise from the combustion engine 4 and favorable operating conditions in relation to, for example, exhaust after treatment systems.

Figure 4:
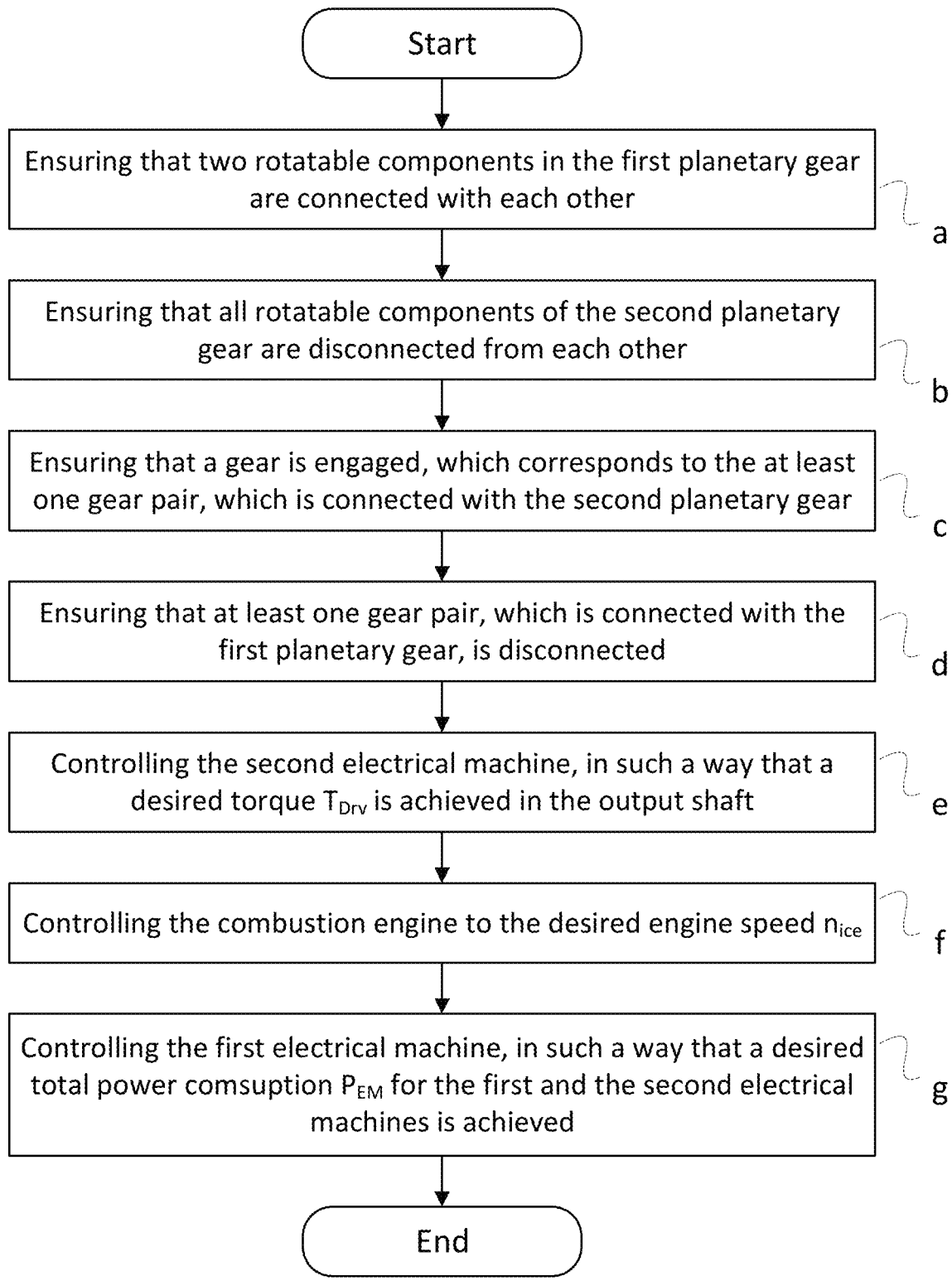
FIG. 4 shows a flow chart of the method to control hybrid powertrain according to the present invention.

FIG. 4 shows a flow chart relating to a method to control a hybrid powertrain 3, in order to achieve a favorable engine speed in a combustion engine 4, arranged in the hybrid powertrain 3. The hybrid powertrain 3 also comprises a gearbox 2 with an input shaft 8 and an output shaft 20; a first planetary gear 10, connected to the input shaft 8 and a first main shaft 34; a second planetary gear 12, connected to the first planetary gear 10 and a second main shaft 36; a first electrical machine 14, connected to the first planetary gear 10; a second electrical machine 16, connected to the second planetary gear 12; at least one gear pair G1, 60, 72, connected with the first main shaft 34, and therefore with the first planetary gear 10 and the output shaft 20; and at least one gear pair G2, 66, 78, connected with the second main shaft 36, and therefore with the second planetary gear 12 and the output shaft 20, wherein the combustion engine 4 is connected with the input shaft 8 of the gearbox 2.

The method comprises the steps:
  a) ensuring that two rotatable components 22, 26, 50 in the first planetary gear 10 are connected with each other;
  b) ensuring that all rotatable components 28, 32, 51 of the second planetary gear 12 are disconnected from each other;
  c) ensuring that a gear is engaged, which corresponds to the at least one gear pair G2, 66, 78, which is connected with the second planetary gear 12;
  d) ensuring that at least one gear pair G1, 60, 72, which connected with the first planetary gear 10, is disconnected;
  e) controlling the second electrical machine 16, in such a way that a desired torque $T_{Drv}$ is achieved in the output shaft 20;
  f) controlling the combustion engine 4 to the desired engine speed $n_{ice}$, and
  g) controlling the first electrical machine 14, in such a way that a desired total power consumption $P_{EM}$ for the first and the second electrical machines 14, 16 is achieved.

The method steps are suitably carried out via the control device 48.

In the event two rotatable components 22, 26, 50 of the first planetary gear 10 are not connected, the combustion engine 4 is preferably controlled in such a way in step a), that a synchronous rotational speed is achieved between a first planetary wheel carrier 50, arranged in the first planetary gear 10, and a first sun wheel 26, following which a first coupling device 56 is shifted, so that the first planetary wheel carrier 50 and the first sun wheel 26 are connected.

In the event that all rotatable components 28, 32, 51 in the second planetary gear 12 are not disconnected, suitably the first and/or the second electrical machine 14, 16 are controlled in such a way in step b), that torque balance is achieved in the second planetary gear 12, following which the second coupling device 58 is shifted, so that a second planetary wheel carrier 51, arranged in the second planetary gear 12, and a second sun wheel 32 are disconnected from each other.

In the event that a gear corresponding to the at least one gear pair G2, 66, 78, which is connected with the second planetary gear 12, is not engaged, suitably the second electrical machine 16 is controlled in such a way in step c), that a synchronous rotational speed is achieved between gear pair G2, 66, 78, which is connected with the second planetary gear 12, and the countershaft 18, which is connected with the output shaft 20, following which a coupling element 86, 90 is shifted, so that the gear pair G2, 66, 78, which is connected with the second planetary gear 12, and the countershaft 18 are connected.

If the at least one gear pair G1, 60, 72, which is connected with the first planetary gear 10, is not disconnected, the first electrical machine 10 is suitably controlled in such a way in step d), that a substantially zero torque state is achieved between the gear pair G1, 60, 72, which is connected with the first planetary gear 10, and the countershaft 20, which is connected with the output shaft 18, following which a coupling element 84, 88 is shifted, so that the gear pair G1, 60, 72, which is connected with the first planetary gear 10, and the countershaft 18 are disconnected.

The second electrical machine 16 is suitably controlled in such a way in step e), that it achieves a torque $T_{EM2}$, which may be determined through equation E1 as described in FIG. 3.

The desired engine speed $n_{ice}$ is suitably a favorable engine speed with respect to among others fuel consumption, noise from the combustion engine 4 and favorable operating conditions in relation to, for example, exhaust after treatment systems. According to one embodiment, the desired engine speed $n_{ice}$ in the combustion engine 4 is determined based on a required power $P_{ice}$ from the combustion engine 4, given the desired torque $T_{Drv}$ in the output shaft 20. The required power $P_{ice}$ from the combustion engine 4 may suitably be calculated according to equation E3, as described in FIG. 3. The desired engine speed $n_{ice}$ may suitably be calculated according to equation E4, as described in FIG. 3.

Preferably, the method steps are carried out in chronological order. Suitably, steps a)-d) are carried out before steps e)-g). Preferably, steps e), f) and g) are carried out simultaneously.

The first electrical machine 14 is suitably controlled at step g), so that it achieves a torque $T_{EM1}$, which may be determined according to equation E2 as described in FIG. 3. Preferably, the total power consumption $P_{EM}$, desired by the first and the second electrical machine 14, 16, is determined in step f), based on the desired power input or output of an energy storage device 46, and the power consumption of other loads connected to the energy storage device 46.

Preferably, the desired torque $T_{Drv}$ is achieved in the output shaft 20 in step d) via a fifth gear pair G3, 21.

According to the invention, a computer program P is provided, stored in the control device 48 and/or the computer 53, which may comprise procedures to control the hybrid powertrain 3 according to the present invention.

The program P may be stored in an executable manner, or in a compressed manner, in a memory M and/or a read/write memory R.

The invention also relates to a computer program product, comprising program code stored in a medium readable by a computer, in order to perform the method steps specified above, when said program code is executed in the control device 48, or in another computer 53 connected to the control device 48. Said program code may be stored in a non-volatile manner on said medium readable by a computer 53.

The components and features specified above may, within the framework of the invention, be combined between different embodiments specified.

The invention claimed is:

1. A method to control a hybrid powertrain, in order to achieve a desired favorable engine speed in a combustion engine, arranged in the hybrid powertrain, wherein the hybrid powertrain also comprises a gearbox with an input shaft and an output shaft; a first planetary gear connected to the input shaft and a first main shaft, wherein the first planetary gear comprises a first set of rotatable components comprising a first ring gear, a first sun wheel, and a first planetary wheel carrier; a first coupling device configured to selectively connect and disconnect from each other the first sun wheel from the first planetary wheel carrier of the first planetary gear via selective engagement and disengagement of the first coupling device; a second planetary gear connected to the first planetary gear and a second main shaft, wherein the second planetary gear comprises a second set of rotatable components comprising a second ring gear, a second sun wheel, and a second planetary wheel carrier; a second coupling device configured to selectively connect to and disconnect from each other the second sun wheel from the second planetary wheel carrier of the second planetary gear via selective engagement and disengagement of the second coupling device; a first electrical machine and a second electrical machine, wherein the first electrical machine is connected to the first ring gear of the first planetary gear, the combustion engine is connected to the first planetary wheel carrier of the first planetary gear, and the first sun wheel of the first planetary gear is connected to an input of the gearbox, and wherein the second electrical machine is connected to the second ring gear of the second planetary gear, the second planetary wheel carrier of the second planetary gear is connected to an input of the gearbox, and second sun wheel of the second planetary gear is connected to the combustion engine; at least one gear pair, connected with the first main shaft, and therefore with the first planetary gear and the output shaft; and at least one gear pair, connected with the second main shaft, and therefore with the second planetary gear and the output shaft, wherein the combustion engine is connected with the input shaft of the gearbox, said method comprising the steps:

a) ensuring that the first sun wheel and the first planetary wheel carrier in the first planetary gear are connected with each other via engagement of the first coupling device;

b) ensuring that the second sun wheel and the second planetary wheel carrier of the second planetary gear are disconnected from each other via disengagement of the second coupling device;

c) ensuring that a gear is engaged, which corresponds to the at least one gear pair, which is connected with the second planetary gear;

d) ensuring that the at least one gear pair, which is connected with the first planetary gear, is disconnected;
e) controlling the second electrical machine in such a way to provide torque to the gear box and thereby achieve a desired torque ($T_{Drv}$) in the output shaft;
f) controlling the combustion engine to a desired engine speed ($n_{ice}$); and
g) controlling the first electrical machine in such a way that a desired total power consumption ($P_{EM}$) for the first and the second electrical machines is achieved.

2. A method according to claim 1, wherein, in the first planetary wheel carrier and the first sun wheel in the first planetary gear are not connected, the combustion engine is controlled in such a way in step a), that a synchronous rotational speed is achieved between a first planetary wheel carrier, arranged in the first planetary gear, and a first sun wheel, following which the first coupling device is shifted, so that the first planetary wheel carrier and the first sun wheel are connected.

3. A method according to claim 1, wherein, in the event all rotatable components in the second planetary gear are not disconnected, the first and/or the second electrical machine is controlled in such a way in step b), that torque balance is achieved in the second planetary gear, following which the second coupling device is shifted, so that the second planetary wheel carrier and the second sun wheel are disconnected from each other.

4. A method according to claim 1, wherein, in the event a gear corresponding to the at least one gear pair, which is connected with the second planetary gear, is not engaged, the second electrical machine is controlled in such a way in step c), that a synchronous rotational speed is achieved between the gear pair, which is connected with the second planetary gear, and a countershaft, which is connected with the output shaft, following which a coupling element is shifted, so that the gear pair, which is connected with the second planetary gear, and the countershaft are connected.

5. A method according to claim 1, wherein, in the event the at least one gear pair, which is connected with the first planetary gear, is not disconnected, the first electrical machine is controlled in such a way in step d), that a substantially zero torque state is achieved between the gear pair, which is connected with the first planetary gear, and a countershaft, which is connected with the output shaft, following which a coupling element is shifted, so that the gear pair, which is connected with the first planetary gear, and the countershaft are disconnected.

6. A method according to claim 1, wherein the desired engine speed ($n_{ice}$) of the combustion engine is determined based on a required power ($P_{ice}$) from the combustion engine.

7. A method according to claim 1, wherein steps e), f) and g) are carried out in parallel.

8. A method according to claim 1, wherein the total desired power consumption of the first and the second electrical machines ($P_{EM}$) is determined in step f), based on the desired power input or output of an energy storage device, and the power consumption of other loads connected to the energy storage device.

9. A method according to claim 1, wherein the desired torque ($T_{Drv}$) is achieved in step d) in the output shaft via a fifth gear pair.

10. A vehicle with a hybrid powertrain, said hybrid powertrain comprising:
a combustion engine;
a gearbox with an input shaft and an output shaft;
a first planetary gear connected to the input shaft and a first main shaft, wherein the first planetary gear comprises a first set of rotatable components comprising a first ring gear, a first sun wheel, and a first planetary wheel carrier;
a first coupling device configured to selectively connect and disconnect from each other the first sun wheel from the first planetary wheel carrier of the first planetary gear via selective engagement and disengagement of the first coupling device;
a second planetary gear connected to the first planetary gear and a second main shaft, wherein the second planetary gear comprises a second set of rotatable components comprising a second ring gear, a second sun wheel, and a second planetary wheel carrier;
a second coupling device configured to selectively connect to and disconnect from each other the second sun wheel from the second planetary wheel carrier of the second planetary gear via selective engagement and disengagement of the second coupling device;
a first electrical machine, wherein the first electrical machine is connected to the first ring gear of the first planetary gear, the combustion engine is connected to the first planetary wheel carrier of the first planetary gear, and the first sun wheel of the first planetary gear is connected to an input of the gearbox;
a second electrical machine, wherein the second electrical machine is connected to the second ring gear of the second planetary gear, the second planetary wheel carrier of the second planetary gear is connected to an input of the gearbox, and second sun wheel of the second planetary gear is connected to the combustion engine;
at least one gear pair, connected with the first main shaft, and therefore with the first planetary gear and the output shaft;
at least one gear pair, connected with the second main shaft, and therefore with the second planetary gear and the output shaft, wherein the combustion engine is connected with the input shaft of the gearbox; and
an electric control device configured to:
a) ensure that the first sun wheel and the first planetary wheel carrier in the first planetary gear are connected with each other via engagement of the first coupling device;
b) ensure that the second sun wheel and the second planetary wheel carrier of the second planetary gear are disconnected from each other via disengagement of the second coupling device;
c) ensure that a gear is engaged, which corresponds to the at least one gear pair, which is connected with the second planetary gear;
d) ensure that the at least one gear pair, which is connected with the first planetary gear, is disconnected;
e) control the second electrical machine in such a way to provide torque to the gear box and thereby achieve a desired torque ($T_{Drv}$) in the output shaft;
f) control the combustion engine to a desired engine speed ($n_{ice}$); and
g) control the first electrical machine in such a way that a desired total power consumption ($P_{EM}$) for the first and the second electrical machines is achieved.

11. A computer program product comprising computer program code stored on a non-transitory computer readable medium readable by a computer, said computer program product used to control a hybrid powertrain, in order to achieve a desired favorable engine speed in a combustion engine, arranged in the hybrid powertrain, wherein the hybrid powertrain also comprises a gearbox with an input shaft and an output shaft; a first planetary gear connected to the input shaft and a first main shaft, wherein the first planetary gear comprises a first set of rotatable components comprising a first ring gear, a first sun wheel, and a first planetary wheel carrier; a first coupling device configured to selectively connect and disconnect from each other the first sun wheel from the first planetary wheel carrier of the first planetary gear via selective engagement and disengagement of the first coupling device; a second planetary gear connected to the first planetary gear and a second main shaft, wherein the second planetary gear comprises a second set of rotatable components comprising a second ring gear, a second sun wheel, and a second planetary wheel carrier; a second coupling device configured to selectively connect to and disconnect from each other the second sun wheel from the second planetary wheel carrier of the second planetary gear via selective engagement and disengagement of the second coupling device; a first electrical machine and a second electrical machine, wherein the first electrical machine is connected to the first ring gear of the first planetary gear, the combustion engine is connected to the first planetary wheel carrier of the first planetary gear, and the first sun wheel of the first planetary gear is connected to an input of the gearbox, and wherein the second electrical machine is connected to the second ring gear of the second planetary gear, the second planetary wheel carrier of the second planetary gear is connected to an input of the gearbox, and second sun wheel of the second planetary gear is connected to the combustion engine; at least one gear pair, connected with the first main shaft, and therefore with the first planetary gear and the output shaft; and at least one gear pair, connected with the second main shaft, and therefore with the second planetary gear and the output shaft, wherein the combustion engine is connected with the input shaft of the gearbox, said computer program code comprising computer instructions to cause one or more computer processors to perform the operations of:
- a) ensuring that the first sun wheel and the first planetary wheel carrier in the first planetary gear are connected with each other via engagement of the first coupling device;
- b) ensuring that the second sun wheel and the second planetary wheel carrier of the second planetary gear are disconnected from each other via disengagement of the second coupling device;
- c) ensuring that a gear is engaged, which corresponds to the at least one gear pair, which is connected with the second planetary gear;
- d) ensuring that the at least one gear pair, which is connected with the first planetary gear, is disconnected;
- e) controlling the second electrical machine in such a way to provide torque to the gear box and thereby achieve a desired torque ($T_{Drv}$) in the output shaft;
- f) controlling the combustion engine to a desired engine speed ($n_{ice}$); and
- g) controlling the first electrical machine in such a way that a desired total power consumption ($P_{EM}$) for the first and the second electrical machines is achieved.

* * * * *